United States Patent
Islam et al.

(10) Patent No.: US 10,681,727 B2
(45) Date of Patent: Jun. 9, 2020

(54) UPLINK TRANSMISSION PARAMETER SELECTION DURING RANDOM ACCESS MESSAGE TRANSMISSION AND RETRANSMISSION

(71) Applicant: QUALCOMM Incorporated, San Diego, CA (US)

(72) Inventors: Muhammad Nazmul Islam, Edison, NJ (US); Junyi Li, Chester, NJ (US); Tao Luo, San Diego, CA (US); Sumeeth Nagaraja, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 15/838,145

(22) Filed: Dec. 11, 2017

(65) Prior Publication Data

US 2018/0176949 A1    Jun. 21, 2018

Related U.S. Application Data

(60) Provisional application No. 62/476,660, filed on Mar. 24, 2017, provisional application No. 62/435,250, filed on Dec. 19, 2016.

(51) Int. Cl.
*H04W 74/08* (2009.01)
*H04W 52/04* (2009.01)
(Continued)

(52) U.S. Cl.
CPC ........ *H04W 74/008* (2013.01); *H04B 7/0695* (2013.01); *H04B 7/088* (2013.01);
(Continued)

(58) Field of Classification Search
CPC . H04W 52/48; H04W 52/146; H04W 52/242; H04W 74/0833
See application file for complete search history.

(56) References Cited

U.S. PATENT DOCUMENTS

| 9,386,604 B2 | 7/2016 | Dinan |
| 10,009,929 B1 * | 6/2018 | Zhou ..................... H04W 52/48 |

(Continued)

FOREIGN PATENT DOCUMENTS

WO    WO 2017044155 A1    3/2017

OTHER PUBLICATIONS

International Search Report and Written Opinion—PCT/US2017/065819—ISA/EPO—dated May 28, 2018 (171105WO).
(Continued)

*Primary Examiner* — Scott M Sciacca
(74) *Attorney, Agent, or Firm* — Holland & Hart LLP

(57) ABSTRACT

Methods, systems, and devices for wireless communication are described for selecting different uplink transmission parameters for transmission or retransmission of a random access message. A user equipment (UE) may transmit or retransmit a random access message such as a layer 2 or layer 3 (L2/L3) message to a base station during a random access procedure. The UE may select a transmission beam, uplink resource or transmission power for the transmission of the L2/L3 message that differ from those used for transmission of a previous random access message. The selection may be based on path loss associated with synchronization signals or previous transmissions. The selection may also be based on a maximum number of retransmissions.

27 Claims, 19 Drawing Sheets

(51) Int. Cl.
  *H04W 74/00* (2009.01)
  *H04W 72/12* (2009.01)
  *H04B 7/08* (2006.01)
  *H04W 52/50* (2009.01)
  *H04W 52/32* (2009.01)
  *H04W 52/24* (2009.01)
  *H04B 7/06* (2006.01)
  *H04W 52/14* (2009.01)
  *H04W 52/48* (2009.01)

(52) U.S. Cl.
  CPC ....... *H04W 52/146* (2013.01); *H04W 52/242* (2013.01); *H04W 52/325* (2013.01); *H04W 52/50* (2013.01); *H04W 72/1231* (2013.01); *H04W 74/0833* (2013.01); *H04W 52/248* (2013.01); *H04W 52/48* (2013.01)

(56) References Cited

U.S. PATENT DOCUMENTS

| | | | |
|---|---|---|---|
| 2009/0259910 A1 | 10/2009 | Lee et al. | |
| 2009/0286566 A1* | 11/2009 | Lindholm | H04W 52/10 455/522 |
| 2010/0172299 A1 | 7/2010 | Fischer et al. | |
| 2012/0063305 A1* | 3/2012 | Chiu | H04W 74/0833 370/230 |
| 2013/0217404 A1 | 8/2013 | Jung | |
| 2014/0140247 A1* | 5/2014 | Venkata | H04W 4/90 370/259 |
| 2014/0376466 A1 | 12/2014 | Jeong et al. | |
| 2015/0057011 A1* | 2/2015 | Di Girolamo | H04W 74/0808 455/454 |
| 2016/0227575 A1 | 8/2016 | Furuskog et al. | |
| 2016/0360516 A1* | 12/2016 | Karout | H04L 1/00 |
| 2017/0195998 A1* | 7/2017 | Zhang | H04B 7/086 |
| 2017/0251460 A1* | 8/2017 | Agiwal | H04W 72/0406 |
| 2017/0325057 A1* | 11/2017 | Zhang | H04W 4/02 |
| 2018/0020487 A1* | 1/2018 | Tsai | H04B 7/0404 |
| 2018/0152882 A1* | 5/2018 | Frenger | H04W 48/14 |

OTHER PUBLICATIONS

Nokia Siemens Networks et al., "PC of RACH Message 3", 3GPP Draft, R1-083096, PC of MSG3, 3rd Generation Partnership Project (3GPP), Mobile Competence Centre, 650, Route Des Lucioles, F-06921 Sophia-Antipolis Cedex, France, No. Jeju, Aug. 12, 2008 (Aug. 12, 2008), XP050316539, , 9 Pages.

NTT DOCOMO Inc: "Views on Random Access Procedure for NR", 3GPP Draft; R1-1612709 RACH Procedure, 3rd Generation Partnership Project (3GPP), Mobile Competence Centre; 650, Route Des Lucioles; F-06921 Sophia-Antipolis Cedex; France vol. RAN WG1, No. Reno, USA; Nov. 14, 2016-Nov. 18, 2016, Nov. 13, 2016 (Nov. 13, 2016), XP051176652, 5 pages, Retrieved from the Internet: URL:http://www.3gpp.org/ftp/Meetings_3GPP_SYNC/RAN1/Docs/ [retrieved on Nov. 13, 2016].

Partial International Search Report—PCT/US2017/065819—ISA/EPO—dated Mar. 12, 2018 (171105WO).

Samsung: "Random Access Procedure in NR", 3GPP Draft, R2-167568, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 13, 2016 (Nov. 13, 2016), XP051177436, pp. 1-7.

* cited by examiner

UPLINK TRANSMISSION PARAMETER SELECTION DURING RANDOM ACCESS MESSAGE TRANSMISSION AND RETRANSMISSION

CROSS REFERENCES

The present Application for patent claims priority to U.S. Provisional Patent Application No. 62/436,250 by Islam, et al., entitled "Uplink Transmission Parameter Selection During Random Access Message Transmission and Retransmission" filed Dec. 19, 2016, and to U.S. Provisional Patent Application No. 62/476,660 by Islam, et al. entitled, "Uplink Transmission parameter Selection During Random Access Message Transmission and Retransmission" filed Mar. 24, 2017, and assigned to the assignee hereof.

BACKGROUND

The following relates generally to wireless communication, and more specifically to uplink transmission parameter selection during random access message transmission and retransmission.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless systems, a UE may utilize a directional transmission to gain access to a medium. For example, a UE may transmit an initial directional transmission in order to gain access to a medium. Following receipt of a response to the initial directional transmission, the UE may then transmit a second directional transmission based on the received response. However, in some instances, transmission conditions may change or transmission directions may be refined, for example, and using the same direction or the same resources for transmission of the second directional transmission as those used for transmission of the initial directional transmission may not be desirable or the most effective.

SUMMARY

In a wireless communications system, such as a millimeter wave (mmW) or a New Radio (NR) system, a base station and a user equipment (UE) may utilize directional transmissions during a random access channel (RACH) procedure. In some cases, after transmitting a directional initial RACH message (e.g., a random access preamble), the UE may receive a random access response from a base station. Prior to transmitting a second RACH message (e.g., an L2/L3 message, a Msg3 transmission, a Radio Resource Control (RRC) connection request message), communication conditions may change and the parameters used for transmitting the initial RACH message may not be appropriate for communication of the second RACH message. The UE may decide to change one or more uplink transmission parameters (e.g., transmission power, transmission beam, RACH resource, etc.) in an attempt to increase the probability of successful reception of the second RACH message at the base station.

In some cases, the UE may not receive confirmation that the base station received the second RACH message. For instance, after a predetermined time, the UE may determine that the second RACH message was not successfully received by the base station and the UE may retransmit the second RACH message. During retransmission, the UE may again select different parameters (e.g., transmission power, RACH resource, beam) than those used in the initial RACH message transmission or in previous transmissions of the second RACH message (e.g., if the UE is retransmitting multiple times). In some cases, the UE may have maximum numbers of retransmissions associated with a RACH resource, a beam, a transmission power, or a combination thereof.

The described techniques relate to improved methods, systems, devices, or apparatuses that support uplink transmission parameter selection during random access message transmission and retransmission.

A method of wireless communication is described. The method may include identifying a first uplink transmission beam for a random access procedure, transmitting, at a first uplink transmission power, a random access preamble based at least in part on the first uplink transmission beam, receiving a random access response message transmitted from a base station in response to the random access preamble, identifying a second uplink transmission beam, selecting a second uplink transmission power based at least in part on a path loss associated with the random access procedure and the identified second uplink transmission beam, and transmitting, to the base station, a connection request based at least in part on the second uplink transmission power and the second uplink transmission beam.

An apparatus for wireless communication is described. The apparatus may include means for identifying a first uplink transmission beam for a random access procedure, means for transmitting, at a first uplink transmission power, a random access preamble based at least in part on the first uplink transmission beam, means for receiving a random access response message transmitted from a base station in response to the random access preamble, means for identifying a second uplink transmission beam, means for selecting a second uplink transmission power based at least in part on a path loss associated with the random access procedure and the identified second uplink transmission beam, and means for transmitting, to the base station, a connection request based at least in part on the second uplink transmission power and the second uplink transmission beam.

Another apparatus for wireless communication is described. The apparatus may include a processor, memory in electronic communication with the processor, and instructions stored in the memory. The instructions may be operable to cause the processor to identify a first uplink transmission beam for a random access procedure, transmit, at a first uplink transmission power, a random access preamble based at least in part on the first uplink transmission beam, receive a random access response message transmitted from a base station in response to the random access preamble, identify a second uplink transmission beam, select a second uplink transmission power based at least in part on a path loss associated with the random access procedure and the identified second uplink transmission beam, and transmit, to the base station, a connection request based at least in part on the second uplink transmission power and the second uplink transmission beam.

A non-transitory computer-readable medium for wireless communication is described. The non-transitory computer-readable medium may include instructions operable to cause a processor to identify a first uplink transmission beam for a random access procedure, transmit, at a first uplink transmission power, a random access preamble based at least in part on the first uplink transmission beam, receive a random access response message transmitted from a base station in response to the random access preamble, identify a second uplink transmission beam, select a second uplink transmission power based at least in part on a path loss associated with the random access procedure and the identified second uplink transmission beam, and transmit, to the base station, a connection request based at least in part on the second uplink transmission power and the second uplink transmission beam.

Some examples of the method, apparatus, and non-transitory computer-readable medium described above may further include processes, features, means, or instructions for participating in a beam refinement process during reception of the random access response message, wherein the path loss associated with the random access procedure may be determined based at least in part on the beam refinement process.

Some examples of the method, apparatus, and non-transitory computer-readable medium described above may further include processes, features, means, or instructions for receiving, from the base station, multiple synchronization signals, wherein the path loss associated with the random access procedure may be determined based at least in part on at least one of the multiple synchronization signals.

Some examples of the method, apparatus, and non-transitory computer-readable medium described above may further include processes, features, means, or instructions for transmitting the connection request may be based at least in part on the second uplink transmission beam different from the first uplink transmission beam.

Some examples of the method, apparatus, and non-transitory computer-readable medium described above may further include processes, features, means, or instructions for selecting the second uplink transmission power may be based at least in part on a uplink transmission power command conveyed in the random access response message.

Some examples of the method, apparatus, and non-transitory computer-readable medium described above may further include processes, features, means, or instructions for selecting the second uplink transmission power comprises adjusting the transmission power conveyed in the random access response message based at least in part on the path loss.

Some examples of the method, apparatus, and non-transitory computer-readable medium described above may further include processes, features, means, or instructions for selecting the second uplink transmission power may be further based at least in part on a retransmission number of the connection request.

Some examples of the method, apparatus, and non-transitory computer-readable medium described above may further include processes, features, means, or instructions for selecting the second uplink transmission power may be further based at least in part on a difference between a path loss associated with the random access response message and a path loss associated with transmission of the random access preamble.

Some examples of the method, apparatus, and non-transitory computer-readable medium described above may further include processes, features, means, or instructions for identifying a first uplink transmission resource for transmission of the random access preamble. Some examples of the method, apparatus, and non-transitory computer-readable medium described above may further include processes, features, means, or instructions for selecting, based at least in part on the random access response message, a second uplink transmission resource different from the first uplink transmission resource. Some examples of the method, apparatus, and non-transitory computer-readable medium described above may further include processes, features, means, or instructions for transmitting the connection request using the second uplink transmission resource.

Some examples of the method, apparatus, and non-transitory computer-readable medium described above may further include processes, features, means, or instructions for receiving, from the base station, multiple synchronization signals, wherein identifying the second uplink transmission beam for the connection request may be based at least in part on reception of one or more of the multiple synchronization signals.

Some examples of the method, apparatus, and non-transitory computer-readable medium described above may further include processes, features, means, or instructions for selecting a third uplink transmission beam different than the second uplink transmission beam. Some examples of the method, apparatus, and non-transitory computer-readable medium described above may further include processes, features, means, or instructions for retransmitting the connection request based at least in part on the third uplink transmission beam.

Some examples of the method, apparatus, and non-transitory computer-readable medium described above may further include processes, features, means, or instructions for receiving, from the base station, a maximum retransmission number. Some examples of the method, apparatus, and non-transitory computer-readable medium described above may further include processes, features, means, or instructions for retransmitting the connection request based at least in part on the maximum retransmission number.

In some examples of the method, apparatus, and non-transitory computer-readable medium described above, the maximum retransmission number may be associated with at least one of a total number of retransmission attempts of the connection request or a maximum number of retransmission attempts of the connection request for each of a plurality of uplink transmission powers.

Some examples of the method, apparatus, and non-transitory computer-readable medium described above may further include processes, features, means, or instructions for receiving, from the base station, an indication of one or more uplink transmit parameters for retransmitting the random access preamble or the connection request, wherein the one or more uplink transmit parameters comprise an uplink transmit power, an uplink transmission resource, or a combination.

A method of wireless communication is described. The method may include transmitting a random access preamble as part of a random access procedure, receiving a random access response message transmitted from a base station in response to the random access preamble, identifying a first uplink transmission beam and a first uplink transmission power, transmitting, to the base station, a connection request based at least in part on the random access response message, the connection request being transmitted using the first uplink transmission beam and at the first uplink transmission power, identifying a second uplink transmission beam different from the first uplink transmission beam, selecting a second uplink transmission power based at least in part on a path loss associated with the random access procedure and the identified second uplink transmission beam, and retransmitting the connection request based at least in part on the second uplink transmission power and the second uplink transmission beam.

An apparatus for wireless communication is described. The apparatus may include means for transmitting a random access preamble as part of a random access procedure, means for receiving a random access response message transmitted from a base station in response to the random access preamble, means for identifying a first uplink transmission beam and a first uplink transmission power, means for transmitting, to the base station, a connection request based at least in part on the random access response message, the connection request being transmitted using the first uplink transmission beam and at the first uplink transmission power, means for identifying a second uplink transmission beam different from the first uplink transmission beam, means for selecting a second uplink transmission power based at least in part on a path loss associated with the random access procedure and the identified second uplink transmission beam, and means for retransmitting the connection request based at least in part on the second uplink transmission power and the second uplink transmission beam.

Another apparatus for wireless communication is described. The apparatus may include a processor, memory in electronic communication with the processor, and instructions stored in the memory. The instructions may be operable to cause the processor to transmit a random access preamble as part of a random access procedure, receive a random access response message transmitted from a base station in response to the random access preamble, identify a first uplink transmission beam and a first uplink transmission power, transmit, to the base station, a connection request based at least in part on the random access response message, the connection request being transmitted using the first uplink transmission beam and at the first uplink transmission power, identify a second uplink transmission beam different from the first uplink transmission beam, select a second uplink transmission power based at least in part on a path loss associated with the random access procedure and the identified second uplink transmission beam, and retransmit the connection request based at least in part on the second uplink transmission power and the second uplink transmission beam.

A non-transitory computer-readable medium for wireless communication is described. The non-transitory computer-readable medium may include instructions operable to cause a processor to transmit a random access preamble as part of a random access procedure, receive a random access response message transmitted from a base station in response to the random access preamble, identify a first uplink transmission beam and a first uplink transmission power, transmit, to the base station, a connection request based at least in part on the random access response message, the connection request being transmitted using the first uplink transmission beam and at the first uplink transmission power, identify a second uplink transmission beam different from the first uplink transmission beam, select a second uplink transmission power based at least in part on a path loss associated with the random access procedure and the identified second uplink transmission beam, and retransmit the connection request based at least in part on the second uplink transmission power and the second uplink transmission beam.

In some examples of the method, apparatus, and non-transitory computer-readable medium described above, the connection request may be retransmitted based at least in part on an absence of a contention resolution message.

In some examples of the method, apparatus, and non-transitory computer-readable medium described above, the connection request may be retransmitted based at least in part on receiving a retransmission grant from the base station.

Some examples of the method, apparatus, and non-transitory computer-readable medium described above may further include processes, features, means, or instructions for receiving, from the base station, a maximum retransmission number associated with the connection request. Some examples of the method, apparatus, and non-transitory computer-readable medium described above may further include processes, features, means, or instructions for retransmitting the connection request based at least in part on the maximum retransmission number.

In some examples of the method, apparatus, and non-transitory computer-readable medium described above, the maximum retransmission number may be associated with at least one of a total number of retransmission attempts of the connection request or a maximum number of retransmission attempts of the connection request for each of a plurality of uplink transmission powers.

A method of wireless communication is described. The method may include receiving, at a first uplink transmission power and over a first random access resource, a random access preamble transmitted from a UE over a first uplink transmission beam, transmitting a random access response message in response to the random access preamble, receiving a connection request based at least in part on the random access response message, transmitting, to the UE, a signal indicating the UE to ramp up transmit power, select a different random access resource, or both, and receiving at a second uplink transmission power, a second random access resource, or both, the retransmitted random access preamble or connection request based at least in part on an absence of a response to the random access preamble or connection request, wherein the second uplink transmission power is ramped up from the first uplink transmission power, and wherein the retransmission is in accordance with a maximum retransmission number associated with the random access preamble or connection request.

An apparatus for wireless communication is described. The apparatus may include means for receiving, at a first uplink transmission power and over a first random access resource, a random access preamble transmitted from a UE over a first uplink transmission beam, means for transmitting a random access response message in response to the random access preamble, means for receiving a connection request based at least in part on the random access response message, means for transmitting, to the UE, a signal indicating the UE to ramp up transmit power, select a different random access resource, or both, and means for receiving at a second uplink transmission power, a second random access resource, or both, the retransmitted random access preamble or connection request based at least in part on an absence of a response to the random access preamble or connection request, wherein the second uplink transmission power is ramped up from the first uplink transmission power, and wherein the retransmission is in accordance with a maximum retransmission number associated with the random access preamble or connection request.

Another apparatus for wireless communication is described. The apparatus may include a processor, memory in electronic communication with the processor, and instructions stored in the memory. The instructions may be operable to cause the processor to receive, at a first uplink transmission power and over a first random access resource, a random access preamble transmitted from a UE over a first uplink transmission beam, transmit a random access response message in response to the random access preamble, receive a connection request based at least in part on the random access response message, transmit, to the UE, a signal indicating the UE to ramp up transmit power, select a different random access resource, or both, and receive at a second uplink transmission power, a second random access resource, or both, the retransmitted random access preamble or connection request based at least in part on an absence of a response to the random access preamble or connection request, wherein the second uplink transmission power is ramped up from the first uplink transmission power, and wherein the retransmission is in accordance with a maximum retransmission number associated with the random access preamble or connection request.

A non-transitory computer-readable medium for wireless communication is described. The non-transitory computer-readable medium may include instructions operable to cause a processor to receive, at a first uplink transmission power and over a first random access resource, a random access preamble transmitted from a UE over a first uplink transmission beam, transmit a random access response message in response to the random access preamble, receive a connection request based at least in part on the random access response message, transmit, to the UE, a signal indicating the UE to ramp up transmit power, select a different random access resource, or both, and receive at a second uplink transmission power, a second random access resource, or both, the retransmitted random access preamble or connection request based at least in part on an absence of a response to the random access preamble or connection request, wherein the second uplink transmission power is ramped up from the first uplink transmission power, and wherein the retransmission is in accordance with a maximum retransmission number associated with the random access preamble or connection request.

DETAILED DESCRIPTION

Figure 1:
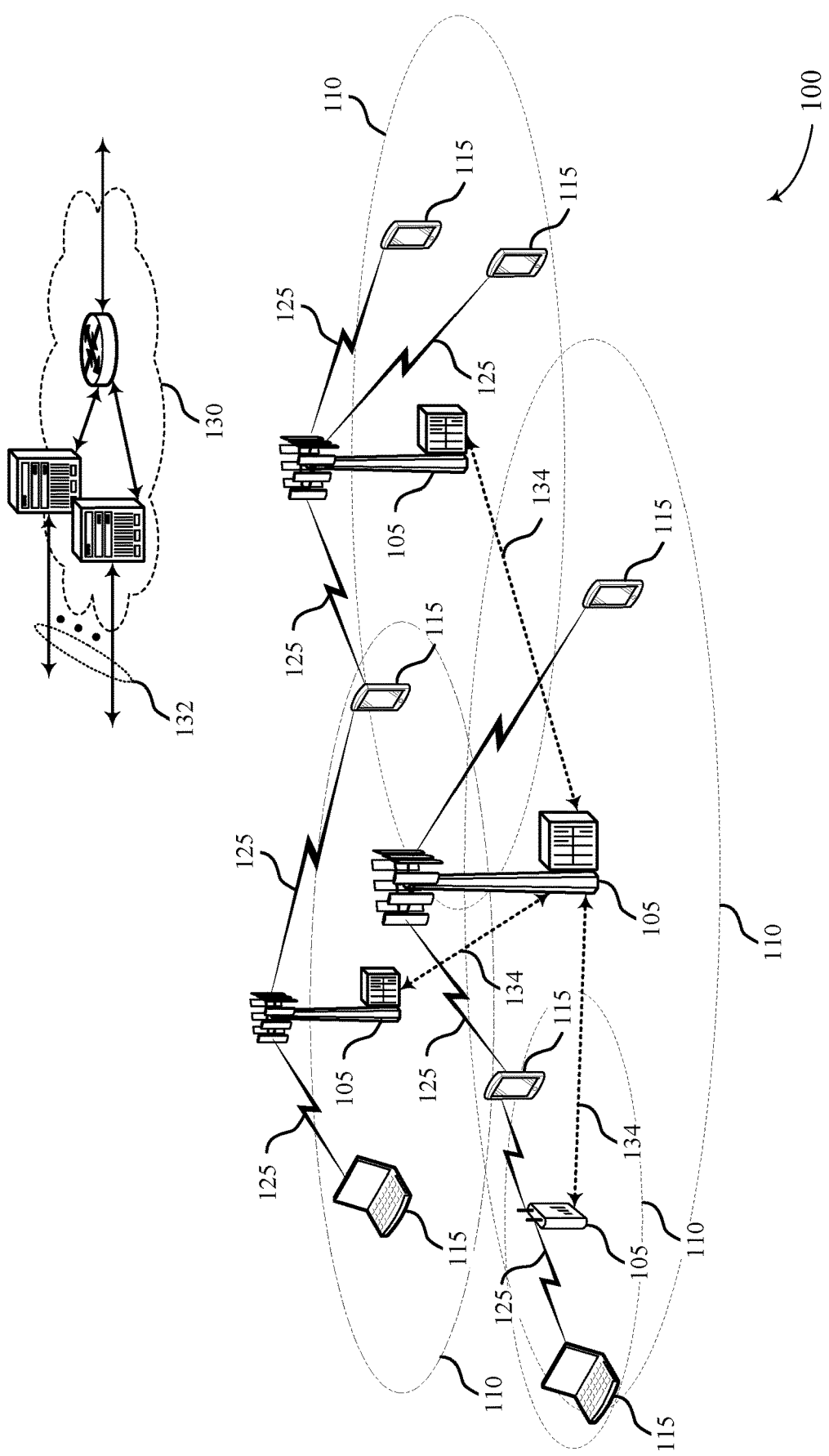
FIG. 1 illustrates an example of a system for wireless communication that supports uplink transmission parameter selection during random access message transmission and retransmission in accordance with aspects of the present disclosure.

In a wireless communications system, such as millimeter wave (mmW) or a new radio (NR) system, a base station and a user equipment (UE) may utilize directional random access channel (RACH) transmissions during a random access procedure (e.g., a four-step RACH procedure). The base station may transmit multiple synchronization signals during a synchronization subframe. For example, the synchronization subframe may contain a number of symbols (e.g., 14 symbols) and the base station may transmit a directional synchronization signal in each symbol. Each directional synchronization signal may be transmitted in a different direction. The UE may receive one or more directional synchronization signals, and may determine a RACH resource and an uplink transmission beam for a directional RACH request message transmission, which may be transmitted to gain initial network access. The base station may listen for signals (e.g., a RACH request message, a random access message, a random access preamble, a Message 1 (Msg1) transmission) in different directions and different time slots and if the base station successfully receives a directional RACH request message from a UE, the base station may transmit a directional RACH response message (e.g., Message 2 (Msg2)) to the UE in response to the RACH request message. In some examples, if the UE does not receive an appropriate response to the first RACH message, the UE may retransmit the first RACH message. For retransmission, the UE may determine or select different parameters for transmission of the first RACH message. For instance, the UE may adjust the transmission power or avoid the symbol or beam that was used during the first instance of the first RACH message. For example, the UE may select a different transmission power, RACH resource, or beam than those used in the previous transmission(s) or retransmission(s).

After receiving the directional RACH response message, the UE may transmit a second RACH message (e.g., a connection request message, a Message 3 (Msg3), an L2/L3 message) to the base station. However, in some instances, communication conditions (e.g., estimated path loss, traffic density, location of the UE, signal strengths, channel quality, etc.) may change and the parameters (e.g., transmission power, transmission beam, RACH resource) used for transmission of the initial RACH request message or random access preamble (e.g., Msg1) may not be suitable for transmitting the second RACH message. Thus, the UE may determine or select different parameters for transmission of the second RACH message. For instance, the UE may adjust the transmission power or avoid the symbol or beam that was used during the initial RACH request message. For example, the UE may select a different transmission power, RACH resource, or beam than those used in the previous transmission(s) or previous retransmission(s).

In some examples, if the UE does not receive an appropriate response to the second RACH message, the UE may retransmit the second RACH message. For retransmission, the UE may again select different parameters for communicating the retransmission to the base station. For instance, the UE may select a different transmission power, beam, or RACH resource than previously used in the initial RACH request message or in the first transmission of the second RACH message or any other previous retransmission(s) (e.g., if the second RACH message is retransmitted multiple times).

In some cases, the base station may infer that a RACH collision has occurred due to the absence of a random access message from the UE, or, may occur due to changing communication conditions. In such cases, the base station may signal (e.g., using a master information block (MIB), master system information block (MSIB), etc.) the UE to ramp up transmit power, select different RACH resources during retransmission, or both.

Aspects of the disclosure are initially described in the context of a wireless communications system. Aspects of the disclosure are further illustrated by and described with reference to apparatus diagrams, system diagrams, and flowcharts that relate to uplink transmission parameter selection during random access message transmission and retransmission.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE (or LTE-Advanced) network, or an NR network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134

(e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network 130 may be an evolved packet core (EPC), which may include at least one mobility management entity (MME), at least one serving gateway (S-GW), and at least one Packet Data Network (PDN) Gateway (P-GW). The MME may be the control node that processes the signaling between the UE 115 and the EPC. All user internet protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched Streaming Service (PSS).

Wireless communications system 100 may operate in an ultra high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 Mhz, etc.) at reduced symbol durations (e.g., 16.67 microseconds). A TTI in eCC may consist of one or multiple symbols. In some cases, the TTI duration (that is, the number of symbols in a TTI) may be variable.

In some cases, wireless system 100 may utilize both licensed and unlicensed radio frequency spectrum bands. For example, wireless system 100 may employ LTE License Assisted Access (LTE-LAA) or LTE Unlicensed (LTE-U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

In some examples, a UE 115 and a base station 105 may participate in a directional RACH procedure. For instance, the base station 105 may transmit synchronization signals in different directions using different transmission beams. The UE 115 may receive one or more of the synchronization signals and select RACH resources for transmission of an initial random access message based on the reception of the synchronization signals. In some cases, the UE 115 may transmit the initial RACH message and receive a RACH response from the base station 105.

During reception of the RACH response from the base station 105, the UE 115 and the base station 105 may participate in a beam refinement procedure in which the base station 105 refines its beam (e.g., narrows a beam width, or selects a beam from one or more beams) used for transmission of downlink messages to the UE 115. During beam refinement, the UE 115 may receive multiple transmission beams from the base station 105 to help the base station 105 determine an appropriate beam to use for communication with the UE 115. Based on the beam refinement procedure and/or the RACH response from the base station 105, the UE 115 may transmit a second random access message (e.g., connection request) to the base station 105. In some cases, however, using the same parameters used during transmission of the initial random access message may not result in a successful reception by the base station 105. For example, transmission conditions such as traffic, channel quality, etc., may change during the time between the initial random access message transmission and the time in which the second random access message is to be transmitted. Thus, prior to sending the second random access message, the UE 115 may modify, select, or otherwise determine transmission parameters (e.g., transmission power, transmission beam, RACH resource) to use for transmission of the second random access message that are different than those used for transmission of the first random access message.

In some instances, the UE 115 may transmit the second random access message, but may not receive an appropriate response from the base station 105. Thus, the UE 115 may decide to retransmit the second random access message using different uplink parameters (e.g., RACH resource, transmission power, transmission beam, etc.) in an attempt to successfully reach the base station 105. In some other cases, the base station 105 may explicitly signal the UE 115 whether to ramp up transmit power, select different RACH resources, or both.

Figure 2:
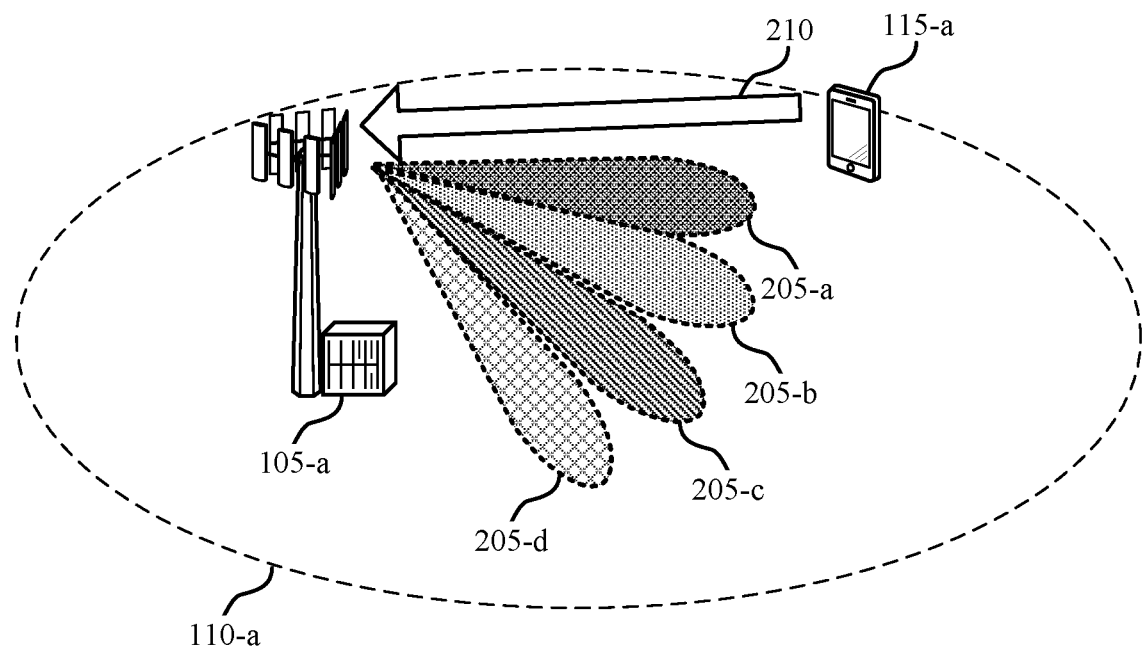
FIG. 2 illustrates an example of a system that supports uplink transmission parameter selection during random access message transmission and retransmission in accordance with aspects of the present disclosure.
Figure 2:
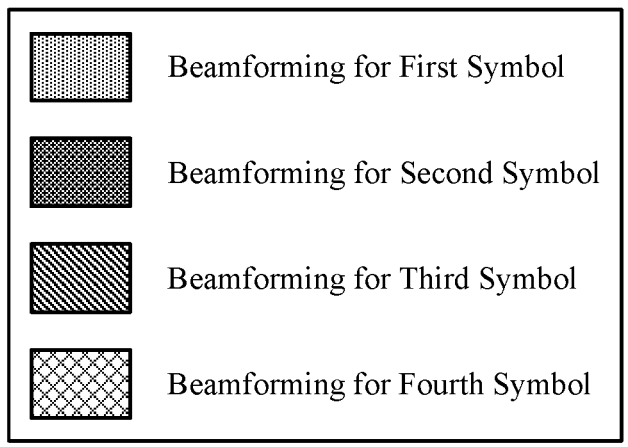

FIG. 2 illustrates an example of a wireless communications system 200 for uplink transmission parameter selection during random access message transmission and retransmission. Wireless communications system 200 may include UE 115-a and base station 105-a, which may be examples of the corresponding devices described with reference to FIG. 1. Base station 105-a may serve coverage area 110-a. In some cases, wireless communication system 200 may operate in the mmW spectrum.

In a mmW system, base station 105-a and UE 115-a may utilize directional RACH transmissions. Base station 105-a may transmit multiple synchronization signals during a synchronization subframe. For example, the synchronization subframe may include a number of symbols (e.g., 1, 8, 14, 20 symbols). Base station 105-a may transmit a directional synchronization signal in each symbol. Each directional synchronization signal may be transmitted in a different direction and on a different beam 205 in order to cover a portion of or all of coverage area 110-a. For example, base station 105-a may transmit a first directional synchronization signal over beam 205-a in a first symbol, a second directional synchronization signal over beam 205-b in a second symbol, a third directional synchronization signal over beam 205-c in a third symbol, and a fourth directional synchronization signal over beam 205-d in a fourth symbol of a synchronization subframe. It should be understood that base station 105-a may transmit any number of directional synchronization signals without departing from the scope of the disclosure.

UE 115-a may receive a directional synchronization signal (e.g., over beam 205-a), and may determine a RACH resource and a beam (e.g., the first symbol and beam 205-a) for transmitting an initial random access message, such as a directional RACH request message, or random access preamble, to gain access to the network. In some cases, UE 115-a may receive multiple directional synchronization signals from base station 105-a, and may select one of the synchronization signals to determine uplink resources and an uplink beam for transmission. For example, the selection may be based on a received signal strength (e.g., reference signal received power (RSRP), received signal strength indication (RSSI), channel quality indicator (CQI), signal to noise ratio (SNR), etc.) of the directional synchronization signal. In some cases, the UE 115-*a* may select a RACH resource or an uplink transmission beam corresponding to the synchronization signal with the greatest RSSI or RSRP, among others.

Base station 105-*a* may listen for signals in different directions and different time slots, and if the base station 105-*a* receives a directional RACH request message, or random access preamble from UE 115-*a*, the base station 105-*a* may transmit a directional RACH response message to UE 115-*a* in response to the directional RACH request message. The RACH response message may be transmitted on a downlink shared channel (DL-SCH) and may include a temporary identifier, an uplink grant resource, a transmission power control (TPC) command, or other information for the UE 115-*a*.

Following reception of a directional RACH response message, the UE 115-*a* may transmit a second random access message (e.g., a connection request) to the base station 105-*a*. In some cases, the second random access message may also be referred to as a Layer 2 (L2) or Layer 3 (L3) message, and may be a Msg3 of a four part random access procedure, an RRC connection request message, a tracking area update, or a scheduling request (SR). In some cases, the base station 105-*a* may refine its transmit beam 205 for transmission of the directional RACH response message, based on for example, channel conditions at the time. The base station 105-*a* may utilize a narrow beam pattern, or increase its transmit power, or vary other beam-related parameters. The beam refinement procedure may be initiated by the base station 105-*a* during transmission of the directional RACH response message and may be used by the UE 115-*a* in selecting a different uplink transmit power or a different uplink transmit beam during transmission of the second random access message, as described below.

In some cases, the UE 115-*a* may transmit the second random access message using parameters different than those used during transmission of the initial random access message. For instance, the quality of the channel or the beam may have changed after transmitting the initial random access message and the UE 115-*a* may decide that using the same transmission parameters may not result in a successful transmission of the second random access message. In another example, the UE 115-*a* may have moved to a different location and the previously determined transmission parameter are no longer suitable for a successful transmission. Additionally or alternatively, after transmitting the second random access message, the base station 105-*a* may not successfully receive the second random access message. For instance if the UE 115-*a* does not receive an appropriate response from the base station 105-*a* (e.g., within a predetermined amount of time), the UE 115-*a* may decide to retransmit the second random access message and may select different transmission parameter(s) than those used in the initial random access message transmission or in previous transmission of the second random access message (e.g., if the second random access message is retransmitted multiple times). In any case, the UE 115-*a* may select a different transmission power, select a different RACH resource, or use a different uplink transmission beam during the retransmission of the second random access message, as compared to the parameters used in previous transmission(s) of the second random access message or in the transmission of the initial random access message. For instance, the UE 115-*a* may select a second uplink transmission power based in part on a path loss associated with the random access procedure, and retransmit the second random access message (or connection request) using an uplink transmission beam different from the uplink transmission for the previous transmission.

In some examples, the resources used for transmission of the second random access message (or retransmission of the second random access message) may be different than the resources used for transmission of the initial random access message or the resources used in a previous transmission of the second random access message. For example, the second random access message may be transmitted using resources orthogonal to resources that are reserved or allocated for the initial random access message. In some cases, the base station 105-*a* may transmit information to the UE 115-*a* about the resources used for RACH communications. For instance, the base station 105-*a* may transmit information indicating the resources reserved for transmission of the initial random access message, the second random access message, retransmission of any preceding random access message, or the like. In some examples, the base station 105-*a* may allocate resources for the initial random access message based on one or more downlink synchronization signals. For instance, the base station 105-*a* may determine a mapping between synchronization signals and resources for initial random access messages or for the second random access message and may transmit information relating to the mapping to the UE 115-*a*.

In some cases, the UE 115-*a* may the select the transmit power based on, for example, a TPC command received in the directional RACH response message from the base station 105-*a*. The transmission power obtained from the TPC command may be adjusted based on a path loss estimated from one or more beams 205 (e.g., received by the UE 115-*a* during synchronization) or from the beams used during a beam refinement procedure.

In some cases, the UE 115-*a* may select a transmission power for transmission or retransmission of the second random access message without an indication from the base station 105-*a*. For instance, the UE 115-*a* may determine a path loss estimate from a downlink transmit beam 205 used to transmit the RACH response message and adjust the transmit power for the second random access message based on the path loss estimate. In some cases, the UE 115-*a* may ramp up transmission power or change the transmission beam during one or more subsequent retransmissions (e.g., based on the path loss estimate). In such cases, the UE 115-*a* may maintain a count of the retransmission number associated with the second random access message, and may base further transmission parameters off of the retransmission number. For example, the transmission power may be based on a retransmission number associated with the second random access message (e.g., the greater the retransmission number, the greater the transmission power used). The retransmission number may be used in combination with path loss estimates (e.g., path loss estimates associated with one or more downlink synchronization beams or beams used during beam refinement or Msg2 transmission, etc.).

According to some aspects, the UE 115-*a* may determine a path loss estimate from the downlink transmit beam 205 in the RACH response message and a delta power based on a retransmission number for the second random access message. In some cases, the network or the base station 105-*a* may specify to the UE 115-*a* the maximum number of retransmissions. For example, the base station 105-*a* may indicate the maximum number of retransmissions over a particular transmission beam, resources, or using a particular transmission power, for the second random access message, using a Master Information Block (MIB), System Information Block (SIB), a Physical Broadcast Channel (PBCH), extended PBCH, Physical Downlink Shared Channel (PDSCH), or a Physical Downlink Control Channel (PDCCH). The UE 115-a may then select a transmission power based on a combination of the path loss estimate and the delta power. In some cases, the delta power may be zero or may have a value based on whether the difference in path loss between a previous transmission and a previous reception exceeds a threshold.

In some cases, the base station 105-a may also define the retransmission process for the second random access message, or connection request, in a hierarchical manner. For example, the base station 105-a may define the maximum number of retransmissions permissible for a given uplink transmission beam or the total number of uplink transmission beam trials. In such cases, the UE 115-a may select a different uplink transmission power for each selected uplink transmission beam, and may switch beams in the event that a previously selected UL transmit beam is deemed unsuccessful.

In some cases, following a beam refinement procedure, the UE 115-a may predict that the second random access message transmission to the base station 105-a will be unsuccessful (e.g., based on changes in channel conditions or UE movement). The UE 115-a may then transmit or retransmit the second random access message in a resource (e.g., a subframe) allocated for the initial or first random access message (e.g, Msg1). For example, the base station 105-a may split resources (e.g., subcarriers or timeslots) in the subframe allocated for the initial random access message and allocate some resources for the second random access message. This technique of transmitting the second random access message on resources dedicated for the first random access message may enable the UE 115-a to convey to the base station 105-a that channel conditions have deviated from the original downlink synchronization signals.

In other examples, the base station 105-a may not split resources in the subframe allocated for the first random access message and the UE 115-a may autonomously select another different subframe for transmitting the second random access message upon unsuccessful receipt of a response. This may reduce the overhead as compared to splitting resources, but may be associated with an increased probability of collision.

In some examples, the UE 115-a may attempt one or more combinations of transmission options for retransmission of the first random access message or the second random access message. For example, during retransmission of a random access message such as a RACH Msg1 preamble, the UE 115-a may attempt ramping the transmission power, selecting different RACH resources (e.g., RACH resource blocks, or selecting a different transmission time, etc.), utilizing a different transmit beam, or any combination thereof.

In some cases, the likelihood of the UE 115-a changing its transmit beam during retransmission of the RACH Msg1 may depend on a beam correspondence scenario. In some cases, beam correspondence may refer to a level of conformity between downlink beams from the base station, and uplink transmission beams from the UE. For instance, transmission-reception beam correspondence at a UE may be considered to be satisfied if the UE determines an appropriate uplink transmission beam, based in part on downlink measurements on one or more received beams. For example, if the UE 115-a has beam correspondence, the UE 115-a may retransmit RACH Msg1 using the original transmit beam. In some other cases, the UE 115-a may retransmit the RACH Msg1 with a different transmit beam. In some examples, the base station 105-a or network may not be aware of the level of beam correspondence for the UE 115-a in advance. In such cases, the selection of the transmit beam during retransmission of the RACH Msg1 may be left to the discretion of the UE 115-a.

In some cases, the UE 115-a may not select a different RACH resource while retransmitting the RACH Msg1 preamble. In such cases, two or more RACH blocks may be combined in a non-coherent manner, which may allow for an increased probability of RACH detection.

In some other cases, the UE 115-a may estimate or detect that the probability of a RACH collision exceeds a threshold (e.g., in a dense RACH scenario). In such cases, the UE 115-a may select different PRACH resources during transmission, instead of ramping transmit power. In some other cases, the base station 105-a may determine the status of a PRACH collision, and may subsequently signal the UE 115-a to ramp up transmit power, or select a different RACH resource during retransmission, or a combination.

In some cases, for example in a multi-beam scenario, the UE 115-a may select its transmit beam during retransmission of the RACH Msg1. Additionally, in a multi-beam scenario, a base station 105 (e.g., an eNB, or gNB) may signal a UE 115 whether to ramp up transmit power, select a different RACH resource during retransmission, or both. In some cases, the signaling from the base station 105 may be a MIB, a MSIB, or any other downlink message.

Figure 3:
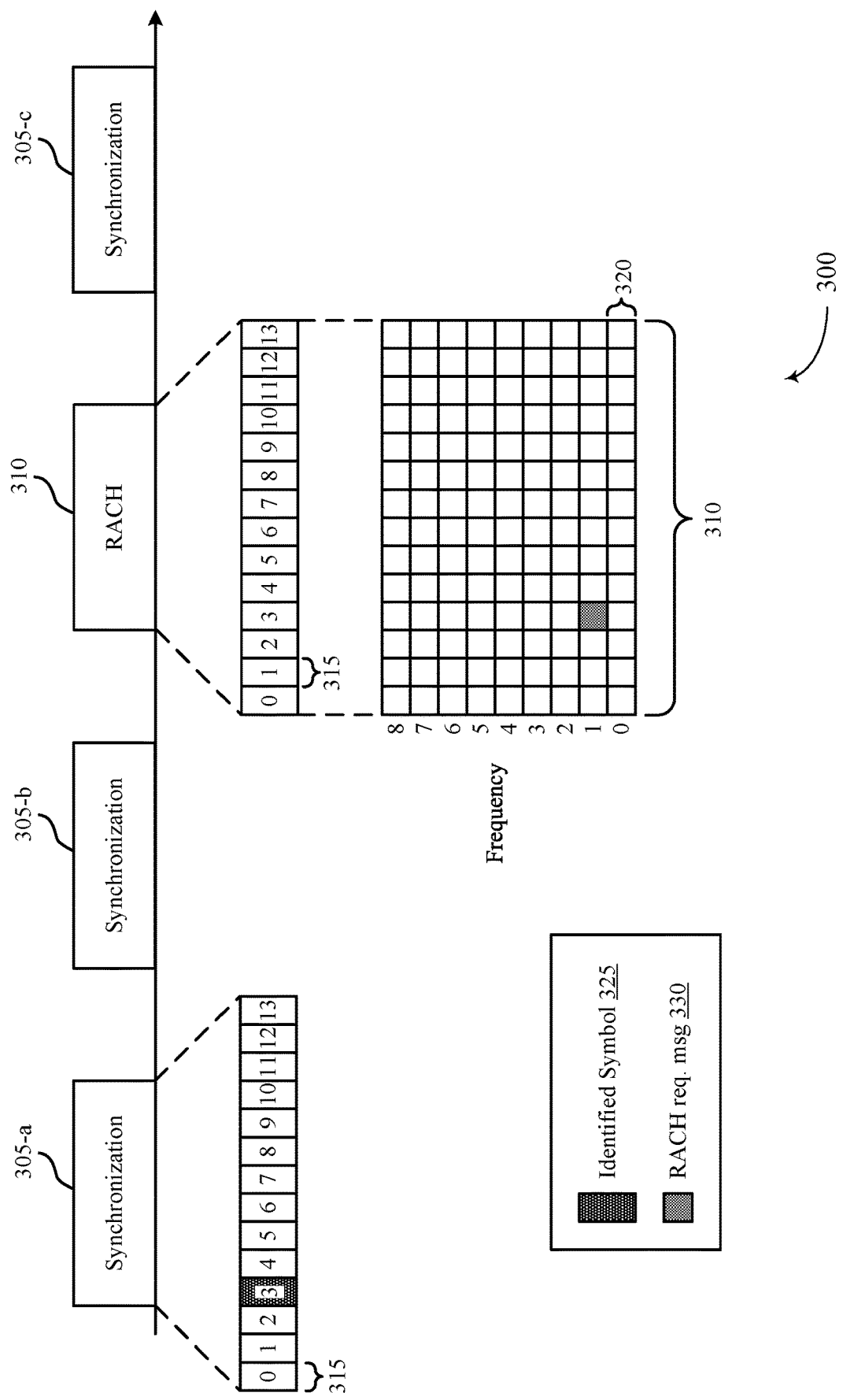
FIG. 3 illustrates an example of a synchronization procedure that supports uplink transmission parameter selection during random access message transmission and retransmission in accordance with aspects of the present disclosure.

FIG. 3 illustrates an example of a synchronization procedure 300 for uplink transmission parameter selection during random access message transmission and retransmission. The synchronization procedure 300 may include synchronization subframes 305 (e.g., synchronization subframes 305-a, 305-b, and 305-c) and RACH subframes 310. Both types of subframes may include one or more symbols 315. The synchronization procedure 300 may be performed by a UE 115 receiving signals from a base station 105, such as the corresponding devices described with reference to FIGS. 1 and 2.

In some cases, the base station 105 may transmit multiple directional synchronization signals during synchronization subframe 305-a. For example, the base station 105 may transmit a directional synchronization signal during each symbol 315-a of synchronization subframe 305-a. Each directional synchronization signal may be transmitted over a different beam in a different direction. For example, synchronization subframe 305-a may contain fourteen symbols 315. The base station 105 may divide a coverage area (or a portion of a coverage area) into fourteen sections and transmit directional synchronization signals on separate beams pointing in each section.

The UE 115 may receive one or more directional synchronization signals from the base station 105, and may select one of the multiple directional synchronization signals. For example, the UE 115 may select the directional synchronization signal with the greatest received signal strength (e.g., RSSI, RSRP, CQI, etc.). The UE 115 may identify the symbol (e.g., symbol 325) and the corresponding beam over which the UE 115 received the selected directional synchronization signal. In some cases, the UE 115 may randomly select a subcarrier region from the subcarrier frequencies 320. The UE 115 may transmit a directional RACH request message to the base station 105 in RACH resource 330, during the identified symbol 325 and over the selected subcarrier region.

The base station 105 may receive the directional RACH request message during the RACH subframe 310. In response, the base station 105 may transmit a directional RACH response message to the UE 115. In some cases, the UE 115 and base station 105 may participate in a beam refinement procedure during transmission of the directional RACH response message, and the base station 105 may refine its transmit beam for transmission of the directional RACH response message (e.g., based on channel conditions). The base station 105 may utilize a narrow beam pattern, increase its transmit power, or select other beam parameters to achieve a higher SNR, RSSI, RSRP, etc. In other examples, the beam refinement procedure initiated by the base station 105 during transmission of the directional RACH response message may trigger the UE 115 to select a different uplink transmit power, a different uplink transmit beam, or a combination thereof, during transmission of the second random access message (e.g., Msg3). For instance, if the channel conditions changed, the UE 115 may detect the changes during the beam refinement procedure and determine that different transmission parameters may be used for transmission of the second random access message.

The UE 115 may then transmit a second random access message (e.g., Msg3), which may be transmitted using parameters different from those used during transmission of the initial random access message. In some cases, the UE 115 may not receive an appropriate response to Msg3 from the base station. For instance, the base station 105 may not have received the Msg3. In another example, the Msg3 or the response message from the base station (e.g., Msg4) may have been interfered with. Thus, the UE 115 may retransmit Msg3 to the base station 105 and may select different parameters for the retransmission. For example, the UE 115 may select a different symbol 315, a different subcarrier frequency 320, or a combination of the two, in order to retransmit the directional RACH message. For example, the UE 115 may have received a second directional synchronization signal during a different symbol than symbol 325. The UE 115 may select the different symbol, and the corresponding different beam, to retransmit the directional RACH request message to the base station 105. In some cases, the UE 115 may identify a second uplink transmission beam for retransmission of Msg 3, which may be different from a first uplink transmission beam used for the first transmission of Msg3. Further, the UE 115 may select a second uplink transmission power based on a path loss associated with the random access procedure, and the identified second uplink transmission beam. In such cases, the UE 115 may retransmit Msg3 based at least in part on the second uplink transmission power and the second uplink transmission beam.

In some other cases, the base station 105 may separately infer that a RACH collision has occurred due to the absence of the Msg3 from the UE 115. In such cases, the base station 105 may signal (e.g., using a MIB or MSIB) the UE to ramp up transmit power, select different RACH resources during retransmission, or both. Further, in some cases, the UE 115 may retransmit the Msg3 (or connection request) based in part on receiving a retransmission grant from the base station 105.

Figure 4:
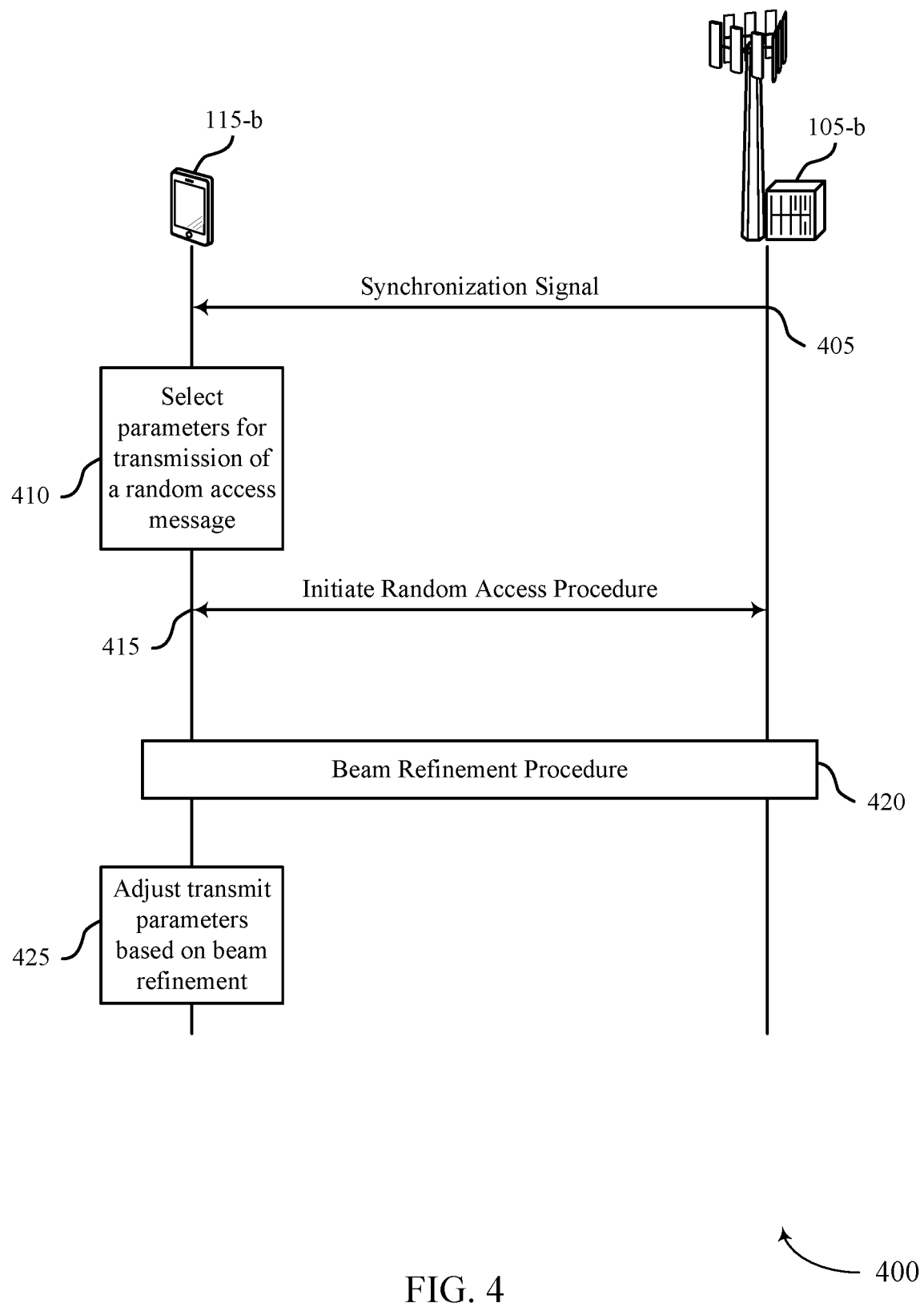
FIG. 4 illustrates an example of a process flow that supports uplink transmission parameter selection during random access message transmission and retransmission in accordance with aspects of the present disclosure.

FIG. 4 illustrates an example of a process flow 400 for uplink transmission parameter selection during random access message transmission and retransmission. The process illustrated by process flow 400 may be implemented by a UE 115-b and a base station 105-b, which may be examples of a UE 115 and base station 105 described with reference to FIGS. 1 and 2. In some examples, the process illustrated by flow diagram 400 may be implemented in a wireless system operating in mmW spectrum.

At 405, UE 115-b may receive one or more downlink synchronization signals from base station 105-b. The base station 105-b may transmit multiple directional synchronization signals during a downlink synchronization subframe. For example, the base station 105-b may transmit a directional synchronization signal during each symbol of the downlink synchronization subframe. Each directional synchronization signal may be transmitted over a different beam in a different direction.

At 410, UE 115-b may select one or more parameters for a random access procedure based on one or more of the directional synchronization signals. For example, the UE 115-b may select the directional synchronization signal with the greatest received signal strength (e.g., RSSI, RSRP, CQI, etc.) and the UE 115-b may identify the symbol and the corresponding beam over which the selected directional synchronization signal was received. In some cases, the UE 115-b may randomly select a subcarrier region comprising one or more subcarriers.

At 415, a random access procedure may be initiated between UE 115-b and base station 105-b. The UE 115-b may transmit a directional RACH request message or a first random access message (e.g., Msg1) to the base station 105-b corresponding to the symbol and subcarrier region identified at step 410.

At 420, a beam refinement procedure may be initiated between base station 105-b and UE 115-b as described with reference to FIGS. 2 and 3. In some cases, the base station 105-b may transmit multiple reference signals (e.g., PSS, SSS, BRS, etc.) over multiple beams in different directions. During beam refinement, the base station 105-b may vary its beam pattern (e.g., using a narrower beam), or increase its transmit power, or vary other beam-related parameters. In some cases, the UE 115-b may use a plurality of receiving beams oriented in different directions to receive the beams transmitted from the base station 105-b. During the beam refinement procedure, the base station 105-b may transmit a RACH response (e.g., Msg2) over multiple transmission beams to the UE 115-b, and the UE 115-b may utilize different reception beams to find a more refined reception beam.

In some cases, the UE 115-b may refine its transmission and reception beams based on one or more synchronization signals transmitted from the base station 105-b. For instance, the base station 105-b may transmit one or more synchronization signals, which may be used by the UE 115-b to refine a reception beam. The UE 115-b then determines an uplink transmission beam based on the refined reception beam.

At 425, the beam refinement procedure initiated by the base station 105-b at 420 may be used by the UE 115-b to select a different uplink transmit power, a different uplink transmit beam, or a combination of the two. The selected parameters may be used during transmission of the second random access message (e.g., Msg3, or connection request message).

Figure 5:
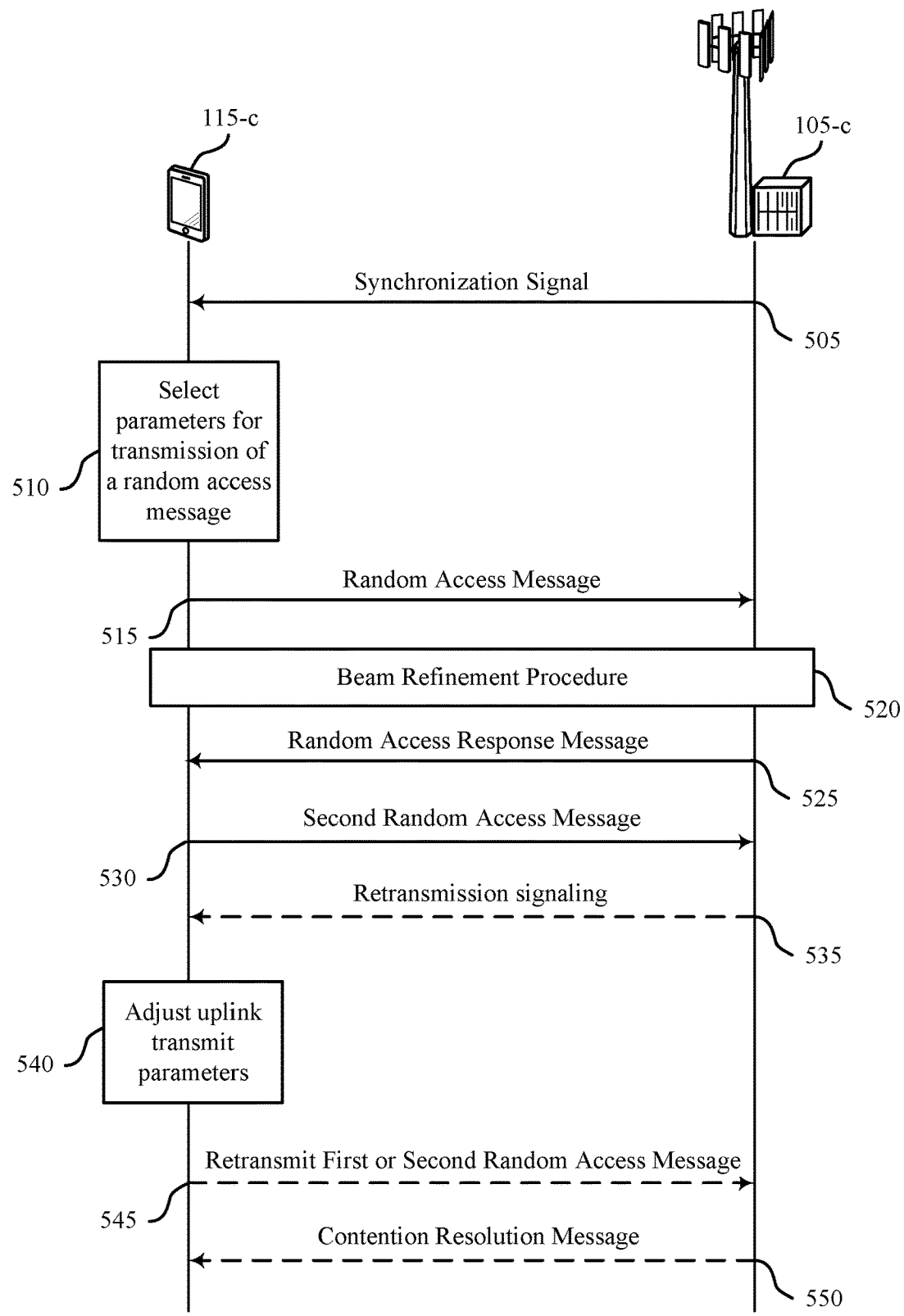
FIG. 5 illustrates an example of a process flow that supports uplink transmission parameter selection during random access message transmission and retransmission in accordance with aspects of the present disclosure.

FIG. 5 illustrates an example of a process flow 500 for uplink transmission parameter selection during random access message transmission and retransmission. The process illustrated by process flow 500 may be implemented by a UE 115-c and a base station 105-c, which may be examples of a UE 115 and base station 105 described with reference to FIGS. 1, 2, and 4. In some examples, the process illustrated by flow diagram 500 may be implemented in a wireless system operating in mmW spectrum.

At 505, UE 115-c may receive one or more downlink synchronization signals from base station 105-c. The base station 105-c may transmit multiple directional synchronization signals during a downlink synchronization subframe. For example, the base station 105-c may transmit a directional synchronization signal during each symbol of the downlink synchronization subframe. Each directional synchronization signal may be transmitted over a different beam in a different direction.

At 510, UE 115-c may select one or more parameters for a random access procedure based on one or more of the directional synchronization signals. For example, the UE 115-c may select the directional synchronization signal with the greatest received signal strength and the UE 115-c may identify the symbol and the corresponding beam over which the selected directional synchronization signal was received. In some cases, the UE 115-c may randomly select a subcarrier region comprising one or more subcarriers.

At 515, the UE 115-c may transmit a directional RACH request message or a first random access message to the base station 105-c corresponding to the symbol and subcarrier region identified at step 510.

At 520, a beam refinement procedure may be initiated between base station 105-c and UE 115-c as described with reference to FIGS. 2, 3, and 4. The base station 105-c may refine its transmit beam for transmission of the directional RACH response message (e.g., Msg2) based on the beam refinement procedure. The base station 105-c may utilize a narrow beam pattern, increase its transmit power, or vary other beam-related parameters for transmission of the random access response message at 525. In some cases, the base station 105-c and UE 115-c may establish refined transmit and receive beams following transmission of the random access response message. Additionally or alternatively, the UE 115-c may refine its transmission and reception beams based on one or more synchronization signals transmitted from the base station 105-c. For instance, the base station 105-c may transmit one or more synchronization signals which may be used by the UE 115-c to find a finer reception beam. The UE 115-c may then determine an uplink transmission beam based on the refined reception beam.

At 530, the UE 115-c may transmit a second random access message to the base station 105-c in response to the random access response message transmitted by the base station 105-c at 525, and based in part on the beam refinement procedure performed at 520. The second random access message may be an RRC connection request message, an L2/L3 message, or a Msg3, for example.

In some other cases, the UE 115-c may not receive a random access response message from the base station 105-c due to an unsuccessful transmission of the first random access message at 515. In some other cases, the base station 105-c may deduce that the transmission of its random access response message at 525 was unsuccessful, or, a collision has occurred during transmission of the second random access message from the UE 115-c, for example, due to the absence of the second random access message from the UE 115-c. In such cases, at 535, the base station 105-c may signal (e.g., using a MIB or MSIB) the UE 115-c to ramp up transmit power or select different RACH resources during retransmission of the first random access message or the second random access message.

At 540, the UE 115-c may not have received an appropriate response from the base station 105-c, or may have determined that the transmission of the first or second random access message was unsuccessful. Thus, the UE 115-c may select or adjust one or more uplink transmission parameters. For instance, the UE 115-c may adjust the transmission power, uplink beam, or resource used during transmission of the second random access message at 530, or the first random access message at 515. In some other cases, the UE 115-c may adjust the transmission parameters by ramping up transmit power or selecting different RACH resources for retransmission, based in part on the signaling received from the base station 105-c at 535.

Based on the adjusted transmission parameters, the UE 115-c may retransmit the first or the second random access message at 545. The UE 115-c may retransmit the first or the second random access message multiple times based on a maximum retransmission number. The UE 115-c may also retransmit the first or the second random access message with different uplink parameters in each retransmission. In some cases, the UE 115-c may determine a path loss estimate for one or more previous transmissions and may use the path loss to determine the transmission power. The transmission power may also be determined based on a delta power function dependent on the retransmission number. Further, the UE 115-c may identify a different uplink transmission beam and/or power for each retransmission of the second random access message. In some cases, the UE 115-c may proceed to retransmit the second random access message (or connection request) based at least in part on the identified uplink transmission beam and power.

At 550, the UE 115-c may receive, from base station 105-c, a response to the second random access message, such as a Msg4 transmission message or a contention resolution message.

Figure 6:
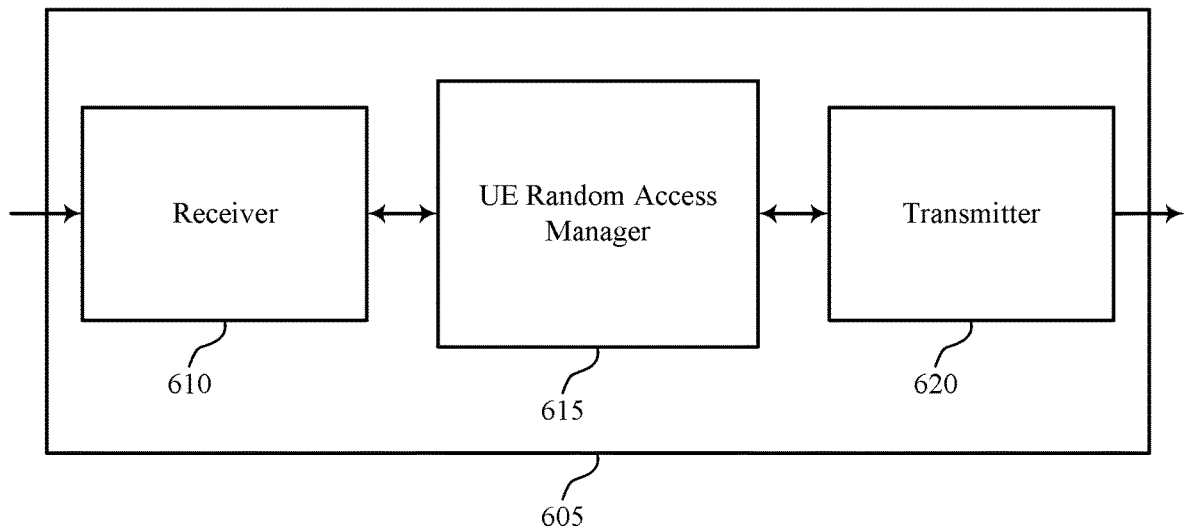
FIGS. 6 through 8 show block diagrams of a device that supports uplink transmission parameter selection during random access message transmission and retransmission in accordance with aspects of the present disclosure.

FIG. 6 shows a block diagram 600 of a wireless device 605 that supports uplink transmission parameter selection during random access message transmission and retransmission in accordance with various aspects of the present disclosure. Wireless device 605 may be an example of aspects of a UE 115 as described with reference to FIG. 1. Wireless device 605 may include receiver 610, UE random access manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to uplink transmission parameter selection during random access message transmission and retransmission, etc.). Information may be passed on to other components of the device. The receiver 610 may be an example of aspects of the transceiver 935 described with reference to FIG. 9.

UE random access manager 615 may be an example of aspects of the UE random access manager 915 described with reference to FIG. 9.

UE random access manager 615 and/or at least some of its various sub-components may be implemented in hardware, software executed by a processor, firmware, or any combination thereof. If implemented in software executed by a processor, the functions of the UE random access manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE random access manager 615 and/or at least some of its various sub-components may be physically located at various positions, including being distributed such that portions of functions are implemented at different physical locations by one or more physical devices. In some examples, UE random access manager 615 and/or at least some of its various sub-components may be a separate and distinct component in accordance with various aspects of the present disclosure. In other examples, UE random access manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE random access manager 615 may identify a first uplink transmission beam for a random access procedure, transmit, at a first uplink transmission power, a random access preamble based on the first uplink transmission beam. The UE random access manager 615 may receive a random access response message transmitted from a base station in response to the random access preamble, identify a second uplink transmission beam, select a second uplink transmission power based on a path loss associated with the random access procedure and the identified second uplink transmission beam, and transmit, to the base station, a connection request based on the second uplink transmission power. The UE random access manager 615 may also transmit, at a first uplink transmission power, a first random access message or random access preamble using a first uplink transmission beam, and receive a random access response message transmitted from a base station in response to the first random access message.

In some cases, the UE random access manager 615 may transmit, to the base station, a connection request based on the random access response message, and retransmit the connection request based on an absence of a response to the connection request and in accordance with a maximum retransmission number associated with the second random access message. In some cases, UE random access manager 615 may retransmit the connection request based in part on receiving a retransmission grant from the base station.

The UE random access manager 615 may also identify a subframe allocated for transmission of a random access preamble, transmit, to a base station, the random access preamble based on the subframe allocated for transmission of the first random access message. In some examples, the UE random access manager 615 may receive a random access response message transmitted by the base station in response to the random access preamble, and transmit, in the subframe allocated for the random access preamble, a connection request message. The UE random access manager 615 may transmit, to a base station, a random access preamble using a first set of resources allocated for transmission of the random access preamble, receive a random access response message transmitted by the base station in response to the random access preamble, determine a second set of resources for transmission of a connection request message, and transmit, using the second set of resources, the connection request message in response to the random access response message.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas.

Figure 7:
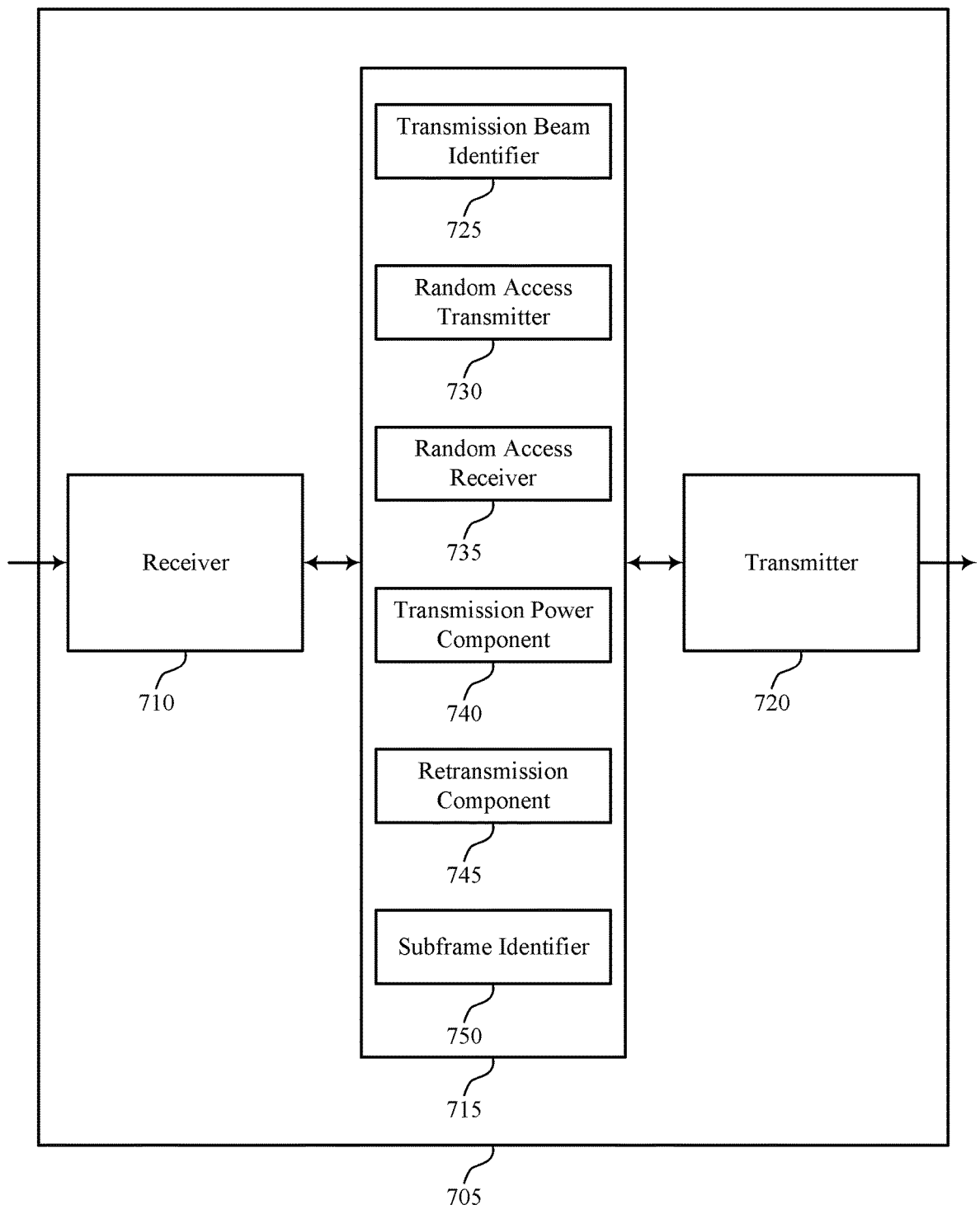

FIG. 7 shows a block diagram 700 of a wireless device 705 that supports uplink transmission parameter selection during random access message transmission and retransmission in accordance with various aspects of the present disclosure. Wireless device 705 may be an example of aspects of a wireless device 605 or a UE 115 as described with reference to FIGS. 1 and 6. Wireless device 705 may include receiver 710, UE random access manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to uplink transmission parameter selection during random access message transmission and retransmission, etc.). Information may be passed on to other components of the device. The receiver 710 may be an example of aspects of the transceiver 935 described with reference to FIG. 9.

UE random access manager 715 may be an example of aspects of the UE random access manager 915 described with reference to FIG. 9.

UE random access manager 715 may also include transmission beam identifier 725, random access transmitter 730, random access receiver 735, transmission power component 740, retransmission component 745, and subframe identifier 750.

Transmission beam identifier 725 may identify a first uplink transmission beam for a random access procedure.

Random access transmitter 730 may transmit, at a first uplink transmission power, a first random access message (or random access preamble) based on the first uplink transmission beam, transmit, to the base station, a second random access message (or connection request) based on the second uplink transmission power. In some cases, transmitting the second random access message includes transmitting the second random access message in a subframe allocated for transmission of the first random access message or using a second uplink transmission resource different from a first uplink transmission resource utilized for transmission of the first random access message.

In some examples, the random access transmitter 730 may transmit, at a first uplink transmission power, a first random access message using a first uplink transmission beam, transmit, to the base station, a second random access message based on the random access response message, and transmit, to a base station, the first random access message based on the subframe allocated for transmission of the first random access message. The random access transmitter 730 may transmit, in the subframe allocated for the first random access message, a second random access message. In some cases, transmitting the second random access message may be based on reception of one or more multiple synchronization signals. The random access transmitter 730 may transmit, to a base station, a first random access message using a first set of resources allocated for transmission of the first random access message, and transmit, using the second set of resources, the second random access message in response to the random access response message.

Random access receiver 735 may receive a random access response message transmitted from a base station in response to the first random access message, and receive, from the base station, a maximum retransmission number, where retransmitting the second random access message is based on the maximum retransmission number. In some cases, the random access receiver 735 may receive, from the base station, an indication of one or more uplink transmit parameters for retransmitting the first random access or the second random access message, wherein the indication may signal the UE to ramp up its uplink transmit power, utilize different transmission resources, or both.

The random access receiver 735 may receive, from the base station, the maximum retransmission number associated with the second random access message, and receive a random access response message transmitted by the base station in response to the first random access message. In some cases, the maximum retransmission number is associated with at least one of a total number of retransmission attempts of the second random access message or a maximum number of retransmission attempts of the second random access message for each of a set of uplink transmission powers. In some examples, the maximum retransmission number is associated with at least one of a total number of retransmission attempts of the second random access message, a maximum number of retransmission attempts of the second random access message for each of a set of uplink transmission powers, a maximum number of retransmission attempts of the second random access message for each of a set of uplink transmission beams, or any combination thereof. Random access receiver 735 may receive a random access response message transmitted by the base station in response to the first random access message.

Transmission power component 740 may select a second uplink transmission power based on a path loss associated with the random access procedure and selecting the second uplink transmission power may be based on a transmission power conveyed in the random access response message. The transmission power component 740 may select the second uplink transmission power by adjusting the transmission power conveyed in the random access response message based on the path loss, and in some cases, selecting the second uplink transmission power may be based on a retransmission number of the second random access message. In some examples, the second uplink transmission power is different from the first uplink transmission power. In some cases, the transmission power component 740 may select a third uplink transmission power for retransmission of the second random access message, based on an indication received from the base station. In some examples, the third uplink transmission power may be different from both the second uplink transmission power (e.g., ramp-up of the second uplink transmission power), and the first uplink transmission power.

Retransmission component 745 may retransmit the second random access message (or connection request) based on the second uplink transmission beam and retransmit the second random access message based on an absence of a response to the second random access message, and in accordance with a maximum retransmission number associated with the second random access message.

Subframe identifier 750 may identify a subframe allocated for transmission of a first random access message. In some cases, subframe identifier 750 may also determine a second set of resources for transmission of a second random access message.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
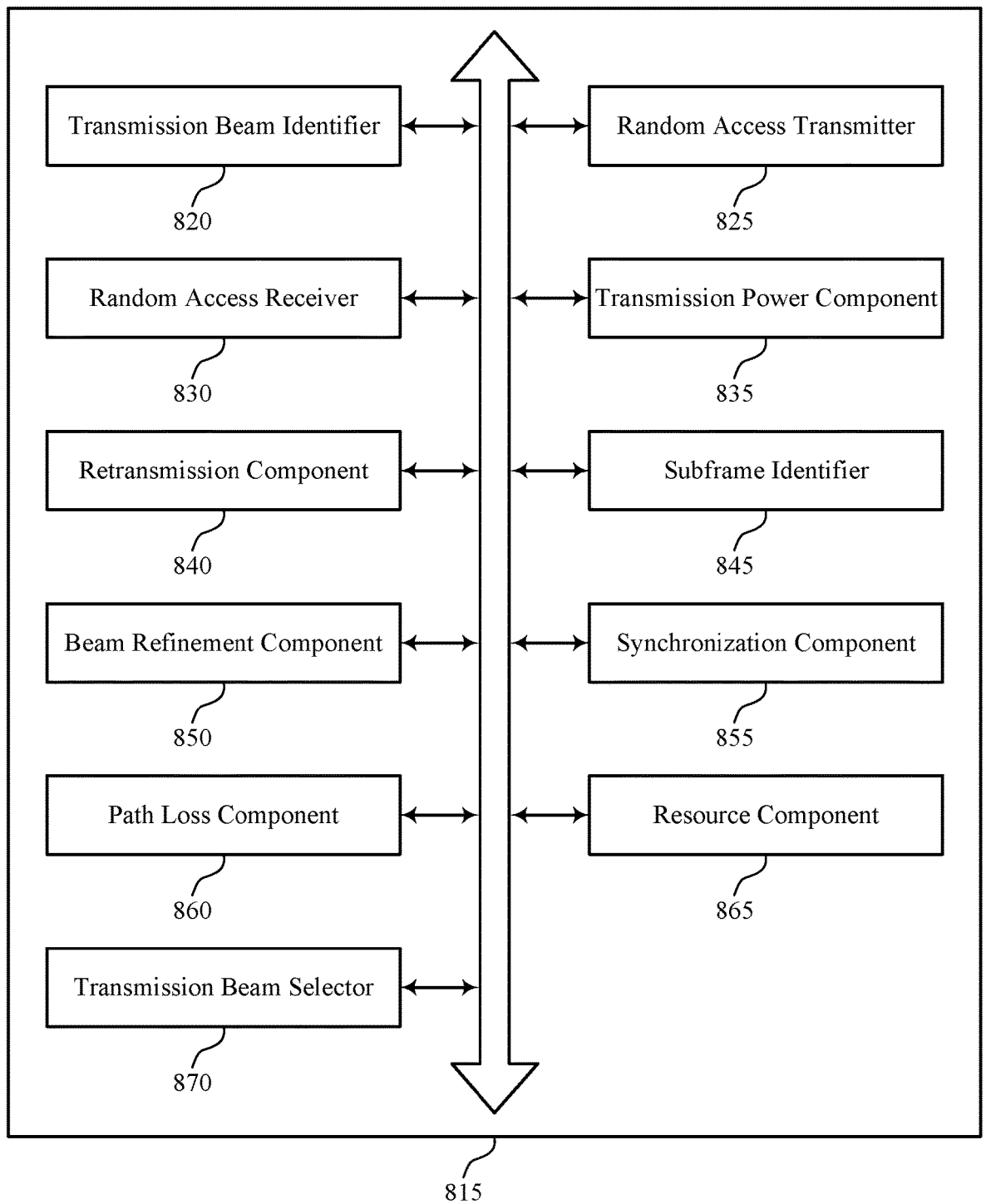

FIG. 8 shows a block diagram 800 of a UE random access manager 815 that supports uplink transmission parameter selection during random access message transmission and retransmission in accordance with various aspects of the present disclosure. The UE random access manager 815 may be an example of aspects of a UE random access manager 615, a UE random access manager 715, or a UE random access manager 915 described with reference to FIGS. 6, 7, and 9. The UE random access manager 815 may include transmission beam identifier 820, random access transmitter 825, random access receiver 830, transmission power component 835, retransmission component 840, subframe identifier 845, beam refinement component 850, synchronization component 855, path loss component 860, resource component 865, and transmission beam selector 870. Each of these modules may communicate, directly or indirectly, with one another (e.g., via one or more buses).

Transmission beam identifier 820 may identify a first uplink transmission beam for a random access procedure.

Random access transmitter 825 may transmit, at a first uplink transmission power, a first random access message (e.g., random access preamble) based on the first uplink transmission beam and transmit, to the base station, a second random access message (e.g., connection request) based on the second uplink transmission power and a random access response message received from the base station. In some examples, transmitting the connection request includes transmitting the connection request in a subframe allocated for transmission of the random access preamble. The random access transmitter 825 may transmit the connection request using a second uplink transmission resource.

In some cases, the random access transmitter 825 may transmit, to a base station, the first random access message based on the subframe allocated for transmission of the first random access message. The random access transmitter 825 may transmit, in the subframe allocated for the first random access message, a second random access message, where transmitting the second random access message is based on reception of one or more of the multiple synchronization signals.

Random access receiver 830 may receive a random access response message transmitted from a base station in response to the first random access message and receive, from the base station, a maximum retransmission number, where retransmitting the second random access message is based on the maximum retransmission number. In some cases, the random access receiver 830 may receive, from the base station, the maximum retransmission number associated with the second random access message, and receive a random access response message transmitted by the base station in response to the first random access message. In some cases, the random access receiver 830 may further receive, from the base station, an indication or signal to ramp up transmit power, utilize different transmission resources, or both, for retransmission of the first or the second random access message.

In some examples, the maximum retransmission number is associated with at least one of a total number of retransmission attempts of the second random access message or a maximum number of retransmission attempts of the second random access message for each of a set of uplink transmission powers. In some cases, the maximum retransmission number is associated with at least one of a total number of retransmission attempts of the second random access message, a maximum number of retransmission attempts of the second random access message for each of a set of uplink transmission powers, a maximum number of retransmission attempts of the second random access message for each of a set of uplink transmission beams, or any combination thereof.

Transmission power component 835 may select a second uplink transmission power based on a path loss associated with the random access procedure, and select the second uplink transmission power based on a transmission power conveyed in the random access response message. In some examples, selecting the second uplink transmission power includes adjusting the transmission power conveyed in the random access response message based on the path loss, and selecting the second uplink transmission power is based on a retransmission number of the second random access message. In some cases, the second uplink transmission power is different from the first uplink transmission power. In some cases, the transmission power component 835 may select a third uplink transmission power or ramp up the first or second uplink transmission powers for retransmission of one of the first or second random access message, based on an indication received from the base station. In some examples, the third uplink transmission power may be different from the first and second uplink transmission powers.

Retransmission component 840 may retransmit the second random access message based on the second uplink transmission beam, on an absence of a response to the second random access message, and in accordance with a maximum retransmission number associated with the second random access message.

Subframe identifier 845 may identify a subframe allocated for transmission of a first random access message. Subframe identifier 845 may determine a second set of resources for transmission of a second random access message. In some cases, the second set of resources may be a subset of the first set of resources.

Beam refinement component 850 may participate in a beam refinement process during reception of the random access response message, where the path loss associated with the random access procedure is determined based on the beam refinement process.

Synchronization component 855 may receive, from the base station, multiple synchronization signals (e.g., PSS, SSS, NR-PSS, NR-SSS, etc.), where the path loss associated with the random access procedure is determined based on at least one of the multiple synchronization signals. The synchronization component 855 may also receive, from the base station, multiple synchronization signals, where identifying the first uplink transmission beam for the first random access message is based on reception of one or more of the multiple synchronization signals, and receive multiple synchronization signals from the base station, where identifying the subframe allocated for transmission of the first random access message is based on reception of one or more of the multiple synchronization signals. Synchronization component 855 may receive multiple synchronization signals from the base station, where the first set of resources or the second set of resources is determined based at least in part on reception of one or more of the multiple synchronization signals. In some examples, the second set of resources is determined based at least in part on a signal quality (e.g., RSRP, RSRQ, CQI, etc.) of one or more of the multiple synchronization signals.

Path loss component 860 may select the second uplink transmission power. In some cases, the selected second uplink transmission power is further based on a difference between a path loss associated with the random access response message and a path loss associated with transmission of the first random access message.

Resource component 865 may receive, from the base station, an indication of one or more resources for transmission of the second random access message, identify, autonomously, one or more resources for transmission of the second random access message, identify a first uplink transmission resource for transmission of the first random access message, and select, based on the random access response message or the indication, a second uplink transmission resource different from the first uplink transmission resource for transmission of the second random access message.

Transmission beam selector 870 may select a second uplink transmission beam different than the first uplink transmission beam.

Figure 9:
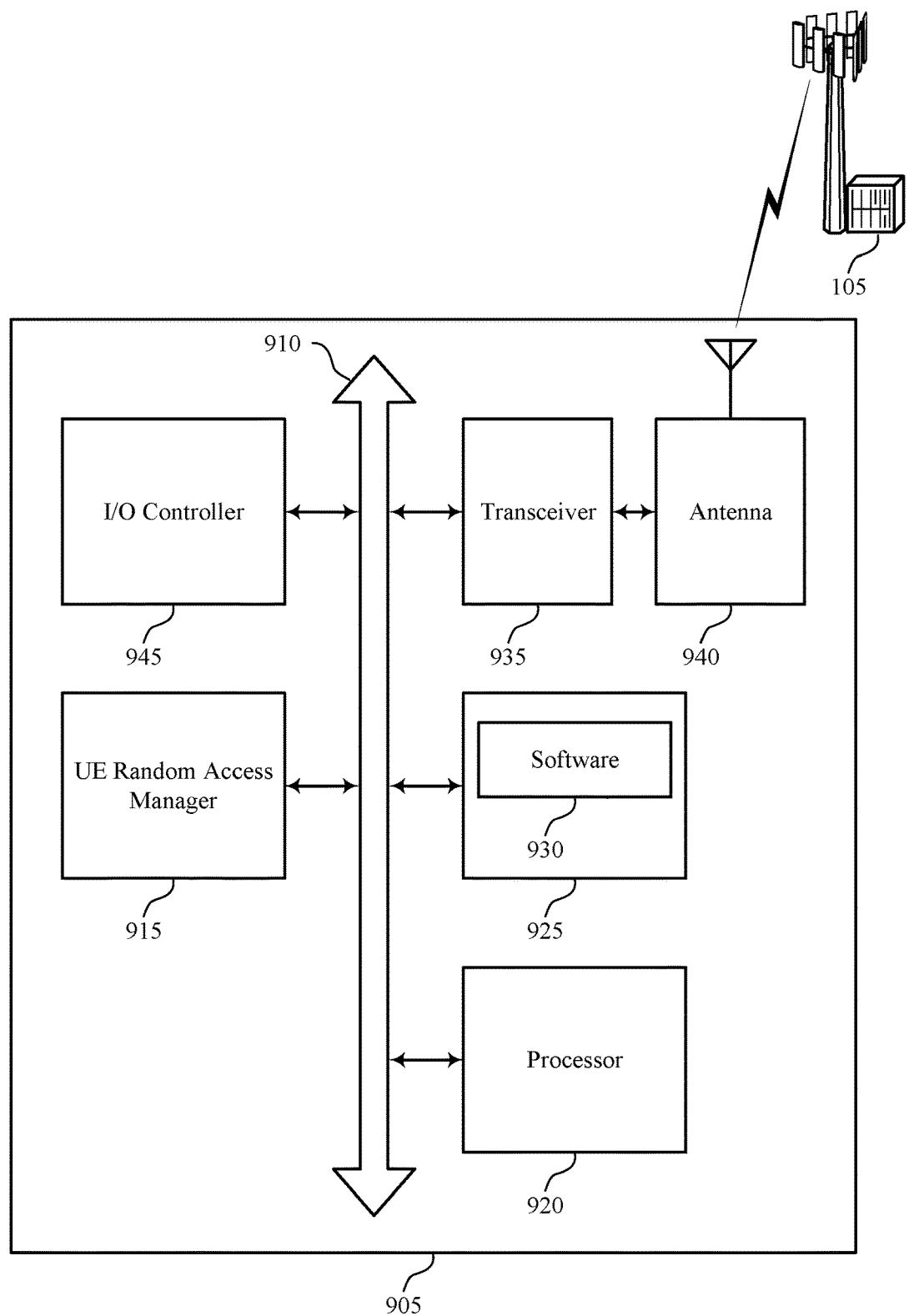
FIG. 9 illustrates a block diagram of a system including a user equipment (UE) that supports uplink transmission parameter selection during random access message transmission and retransmission in accordance with aspects of the present disclosure.

FIG. 9 shows a diagram of a system 900 including a device 905 that supports uplink transmission parameter selection during random access message transmission and retransmission in accordance with various aspects of the present disclosure. Device 905 may be an example of or include the components of wireless device 605, wireless device 705, or a UE 115 as described above, e.g., with reference to FIGS. 1, 6 and 7. Device 905 may include components for bi-directional voice and data communications including components for transmitting and receiving communications, including UE random access manager 915, processor 920, memory 925, software 930, transceiver 935, antenna 940, and I/O controller 945. These components may be in electronic communication via one or more busses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting uplink transmission parameter selection during random access message transmission and retransmission).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support uplink transmission parameter selection during random access message transmission and retransmission. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
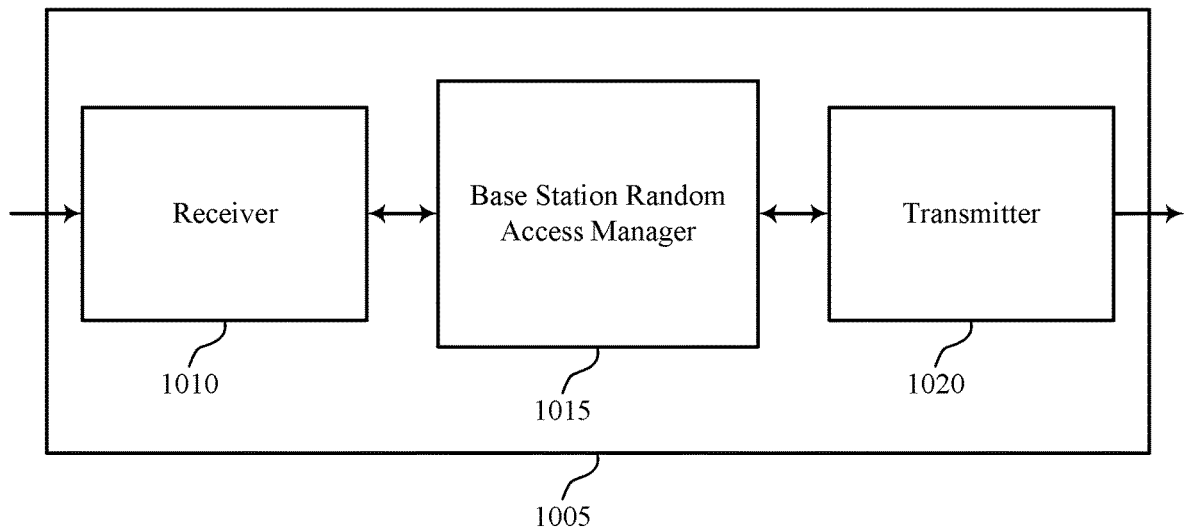
FIGS. 10 through 12 show block diagrams of a device that supports uplink transmission parameter selection during random access message transmission and retransmission in accordance with aspects of the present disclosure.

FIG. 10 shows a block diagram 1000 of a wireless device 1005 that supports uplink transmission parameter selection during random access message transmission and retransmission in accordance with various aspects of the present disclosure. Wireless device 1005 may be an example of aspects of a base station 105 as described with reference to FIG. 1. Wireless device 1005 may include receiver 1010, base station random access manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to uplink transmission parameter selection during random access message transmission and retransmission, etc.). Information may be passed on to other components of the device. The receiver 1010 may be an example of aspects of the transceiver 1335 described with reference to FIG. 13.

Base station random access manager 1015 may be an example of aspects of the base station random access manager 1315 described with reference to FIG. 13.

Base station random access manager 1015 and/or at least some of its various sub-components may be implemented in hardware, software executed by a processor, firmware, or any combination thereof. If implemented in software executed by a processor, the functions of the base station random access manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station random access manager 1015 and/or at least some of its various sub-components may be physically located at various positions, including being distributed such that portions of functions are implemented at different physical locations by one or more physical devices. In some examples, base station random access manager 1015 and/or at least some of its various sub-components may be a separate and distinct component in accordance with various aspects of the present disclosure. In other examples, base station random access manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station random access manager 1015 may receive, via a first reception beam, a first random access message (e.g., a random access preamble) from a wireless device, transmit, to the wireless device, a random access response message based on the first random access message, and receive, in a subframe allocated for the first random access message, a second random access message (e.g., connection request) from the wireless device.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas.

Figure 11:
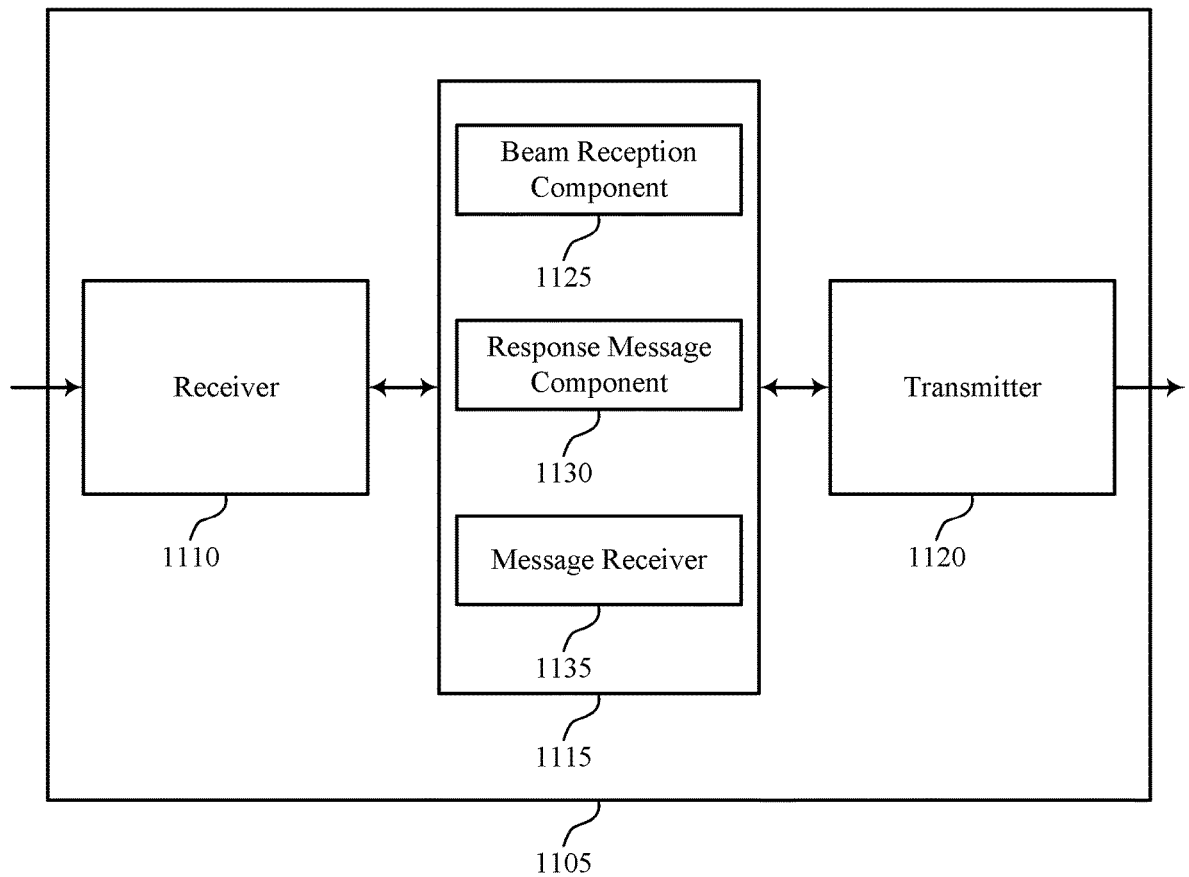

FIG. 11 shows a block diagram 1100 of a wireless device 1105 that supports uplink transmission parameter selection during random access message transmission and retransmission in accordance with various aspects of the present disclosure. Wireless device 1105 may be an example of aspects of a wireless device 1005 or a base station 105 as described with reference to FIGS. 1 and 10. Wireless device 1105 may include receiver 1110, base station random access manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to uplink transmission parameter selection during random access message transmission and retransmission, etc.). Information may be passed on to other components of the device. The receiver 1110 may be an example of aspects of the transceiver 1335 described with reference to FIG. 13.

Base station random access manager 1115 may be an example of aspects of the base station random access manager 1315 described with reference to FIG. 13.

Base station random access manager 1115 may also include beam reception component 1125, response message component 1130, and message receiver 1135.

Beam reception component 1125 may receive, via a first reception beam, a first random access message, such as a random access preamble, from a wireless device.

Response message component 1130 may transmit, to the wireless device, a random access response message based on the first random access message.

Message receiver 1135 may receive, in a subframe allocated for the first random access message, a second random access message, such as a connection request message, from the wireless device which may include receiving the second random access message via a second reception beam different from the first reception beam. In some cases, the second random access message may be received over a different set of random access resources, as compared to the first random access message.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas.

Figure 12:
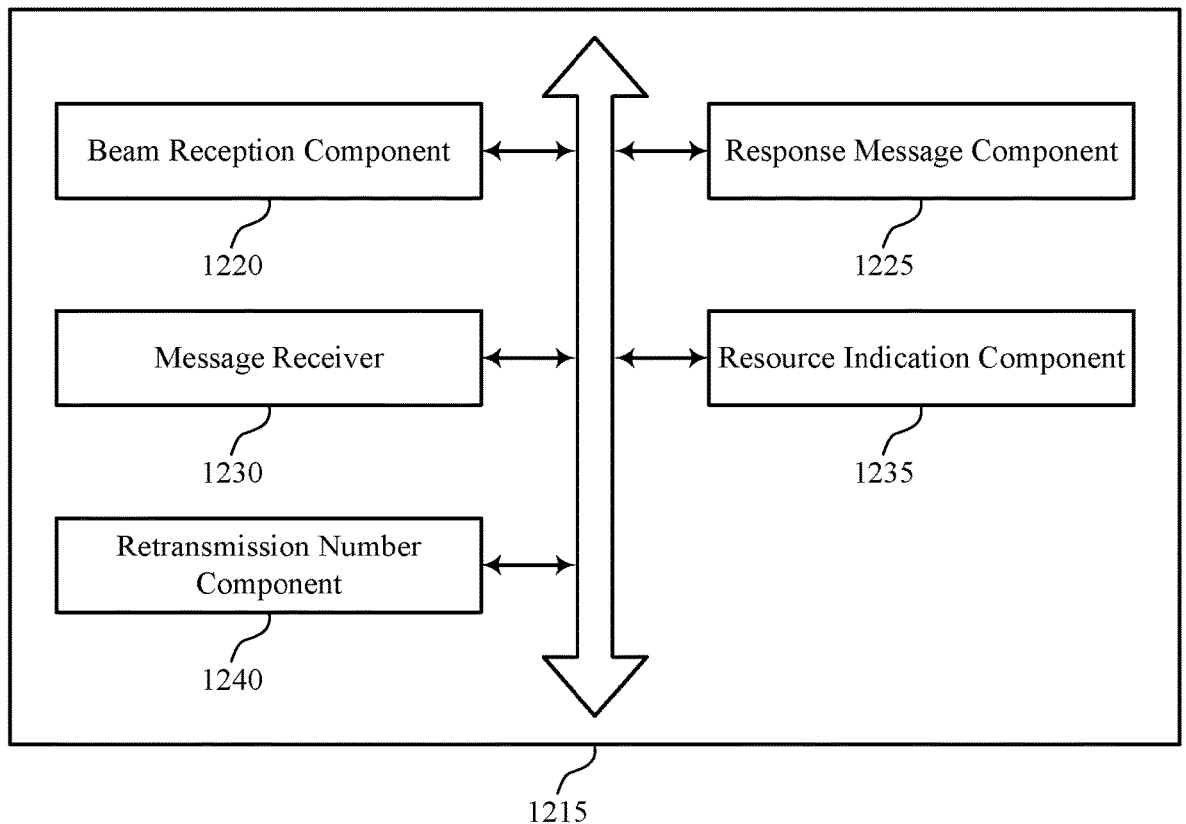

FIG. 12 shows a block diagram 1200 of a base station random access manager 1215 that supports uplink transmission parameter selection during random access message transmission and retransmission in accordance with various aspects of the present disclosure. The base station random access manager 1215 may be an example of aspects of a base station random access manager 1315 described with reference to FIGS. 10, 11, and 13. The base station random access manager 1215 may include beam reception component 1220, response message component 1225, message receiver 1230, resource indication component 1235, and retransmission number component 1240. Each of these modules may communicate, directly or indirectly, with one another (e.g., via one or more buses).

Beam reception component 1220 may receive, via a first reception beam, a first random access message from a wireless device.

Response message component 1225 may transmit, to the wireless device, a random access response message based on the first random access message.

Message receiver 1230 may receive, in a subframe allocated for the first random access message, a second random access message from the wireless device which may include receiving the second random access message via a second reception beam different from the first reception beam.

Resource indication component 1235 may transmit, to the wireless device, an indication of one or more resources for transmission of the second random access message.

Retransmission number component 1240 may transmit a maximum retransmission number corresponding to the second random access message. In some cases, the maximum retransmission number is associated with at least one of a total number of retransmission attempts of the second random access message or a maximum number of retransmission attempts of the second random access message for each of a set of uplink transmission powers. In some cases, the retransmission number component 1240 may further transmit an indication of ramping up the uplink transmit power, utilizing different RACH resources, or both, for retransmission of the first or the second random access message.

Figure 13:
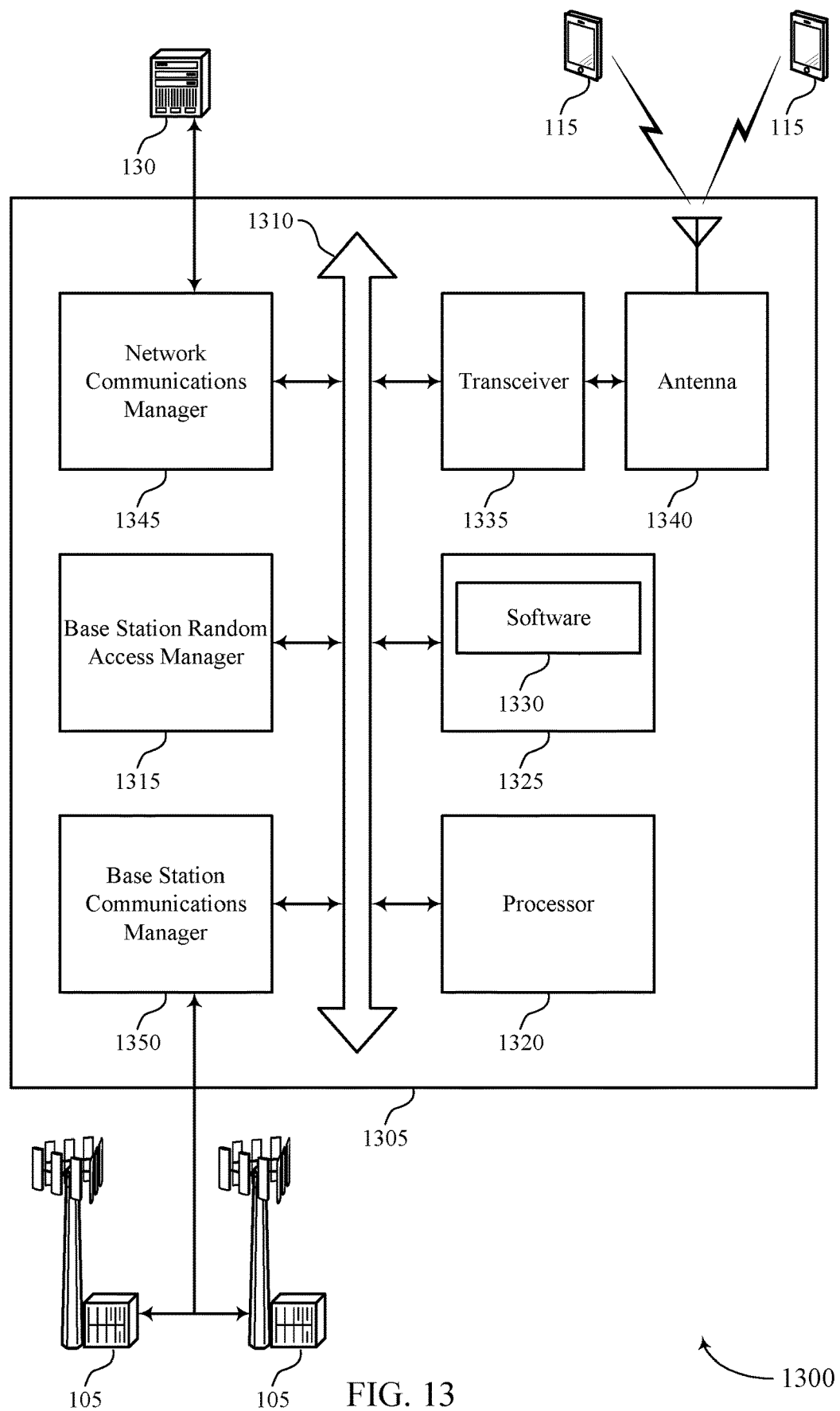
FIG. 13 illustrates a block diagram of a system including a base station that supports uplink transmission parameter selection during random access message transmission and retransmission in accordance with aspects of the present disclosure.

FIG. 13 shows a diagram of a system 1300 including a device 1305 that supports uplink transmission parameter selection during random access message transmission and retransmission in accordance with various aspects of the present disclosure. Device 1305 may be an example of or include the components of base station 105 as described above, e.g., with reference to FIG. 1. Device 1305 may include components for bi-directional voice and data communications including components for transmitting and receiving communications, including base station random access manager 1315, processor 1320, memory 1325, software 1330, transceiver 1335, antenna 1340, network communications manager 1345, and base station communications manager 1350. These components may be in electronic communication via one or more busses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting uplink transmission parameter selection during random access message transmission and retransmission).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware and/or software operation such as the interaction with peripheral components or devices.

Software 1330 may include code to implement aspects of the present disclosure, including code to support uplink transmission parameter selection during random access message transmission and retransmission. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Base station communications manager 1350 may manage communications with other base station 105, and may include a controller or scheduler for controlling communications with UEs 115 in cooperation with other base stations 105. For example, the base station communications manager 1350 may coordinate scheduling for transmissions to UEs 115 for various interference mitigation techniques such as beamforming or joint transmission. In some examples, base station communications manager 1350 may provide an X2 interface within an LTE/LTE-A wireless communication network technology to provide communication between base stations 105.

Figure 14:
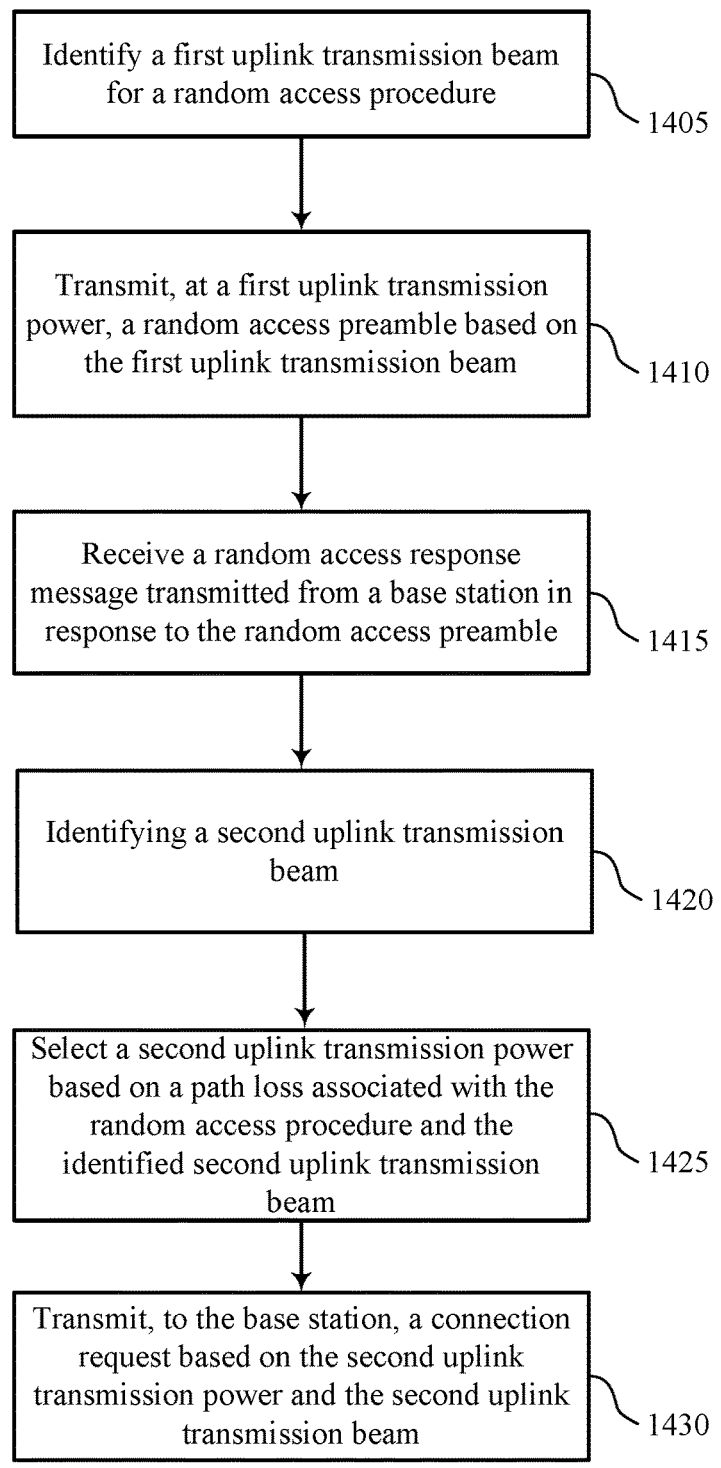
FIGS. 14 through 19 illustrate methods for uplink transmission parameter selection during random access message transmission and retransmission in accordance with aspects of the present disclosure.

FIG. 14 shows a flowchart illustrating a method 1400 for uplink transmission parameter selection during random access message transmission and retransmission in accordance with various aspects of the present disclosure. The operations of method 1400 may be implemented by a UE 115 or its components as described herein. For example, the operations of method 1400 may be performed by a UE random access manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1405, the UE 115 may identify a first uplink transmission beam for a random access procedure. The operations of block 1405 may be performed according to the methods described with reference to FIGS. 1 through 5. In certain examples, aspects of the operations of block 1405 may be performed by a transmission beam identifier as described with reference to FIGS. 6 through 9.

At 1410, the UE 115 may transmit, at a first uplink transmission power, a random access preamble based at least in part on the first uplink transmission beam. The operations of block 1410 may be performed according to the methods described with reference to FIGS. 1 through 5. In certain examples, aspects of the operations of block 1410 may be performed by a random access transmitter as described with reference to FIGS. 6 through 9.

At 1415, the UE 115 may receive a random access response message transmitted from a base station in response to the random access preamble. The operations of block 1415 may be performed according to the methods described with reference to FIGS. 1 through 5. In certain examples, aspects of the operations of block 1415 may be performed by a random access receiver as described with reference to FIGS. 6 through 9.

At 1420, the UE 115 may identify a second uplink transmission beam for the random access procedure. The operations of block 1420 may be performed according to the methods described with reference to FIGS. 1 through 5. In certain examples, aspects of the operations of block 1420 may be performed by a transmission power component as described with reference to FIGS. 6 through 9.

At 1425, the UE 115 may select a second uplink transmission power based at least in part on a path loss associated with the random access procedure and the identified second uplink transmission beam. The operations of block 1425 may be performed according to the methods described with reference to FIGS. 1 through 5. In certain examples, aspects of the operations of block 1425 may be performed by a transmission beam identifier as described with reference to FIGS. 6 through 9.

At 1430, the UE 115 may transmit, to the base station, a connection request message based at least in part on the second uplink transmission power and the identified second uplink transmission beam. The operations of block 1430 may be performed according to the methods described with reference to FIGS. 1 through 5. In certain examples, aspects of the operations of block 1430 may be performed by a random access transmitter as described with reference to FIGS. 6 through 9.

Figure 15:
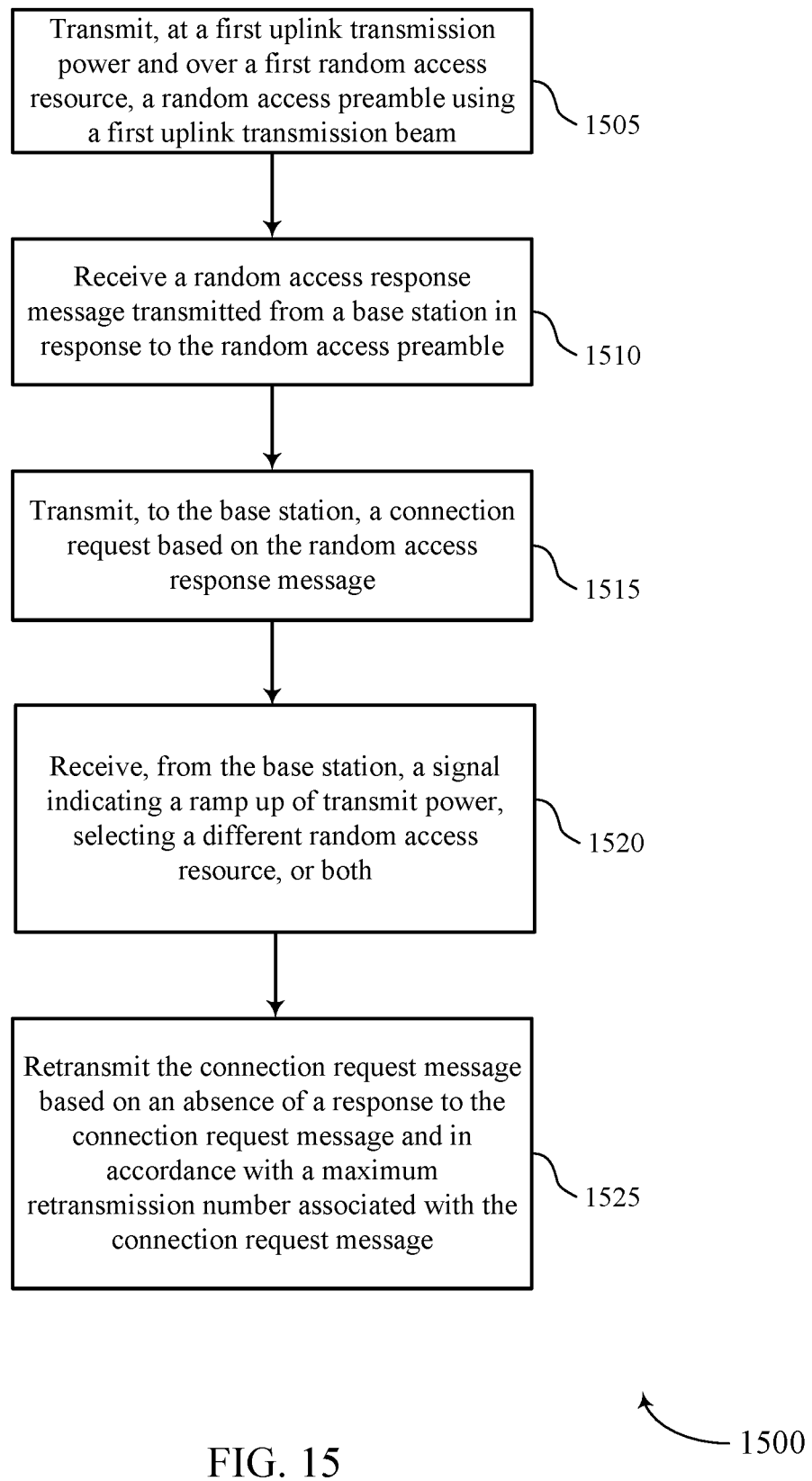

FIG. 15 shows a flowchart illustrating a method 1500 for uplink transmission parameter selection during random access message transmission and retransmission in accordance with various aspects of the present disclosure. The operations of method 1500 may be implemented by a UE 115 or its components as described herein. For example, the operations of method 1500 may be performed by a UE random access manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1505, the UE 115 may transmit, at a first uplink transmission power and over a first random access resource, a random access preamble using a first uplink transmission beam. The operations of block 1505 may be performed according to the methods described with reference to FIGS. 1 through 5. In certain examples, aspects of the operations of block 1505 may be performed by a random access transmitter as described with reference to FIGS. 6 through 9.

At 1510, the UE 115 may receive a random access response message transmitted from a base station in response to the random access preamble. The operations of block 1510 may be performed according to the methods described with reference to FIGS. 1 through 5. In certain examples, aspects of the operations of block 1510 may be performed by a random access receiver as described with reference to FIGS. 6 through 9.

At 1515, the UE 115 may transmit, to the base station, a connection request based at least in part on the random access response message. The operations of block 1515 may be performed according to the methods described with reference to FIGS. 1 through 5. In certain examples, aspects of the operations of block 1515 may be performed by a random access transmitter as described with reference to FIGS. 6 through 9.

At 1520, the UE 115 may receive, from the base station, a signal indicating the UE to ramp up transmit power, select a different random resource, or both. In some cases, the indication may be in response to the base station inferring that a RACH collision has occurred due to the absence of a connection request message from the UE, changing communication conditions, etc. The operations of block 1520 may be performed according to the methods described with reference to FIGS. 1 through 5. In certain examples, aspects of the operations of block 1520 may be performed by a random access receiver as described with reference to FIGS. 6 through 9.

At 1525, the UE 115 may retransmit the connection request message based at least in part on an absence of a response to the connection request and in accordance with a maximum retransmission number associated with the connection request message. In some cases, the UE may autonomously decide to select different parameters for communicating the retransmission to the base station, for instance, by selecting a different transmission power, beam, or RACH resource than previously used in the initial RACH request message, or in the first transmission of the connection request message, or any other previous retransmission(s). The operations of block 1525 may be performed according to the methods described with reference to FIGS. 1 through 5. In certain examples, aspects of the operations of block 1525 may be performed by a retransmission component as described with reference to FIGS. 6 through 9.

Figure 16:
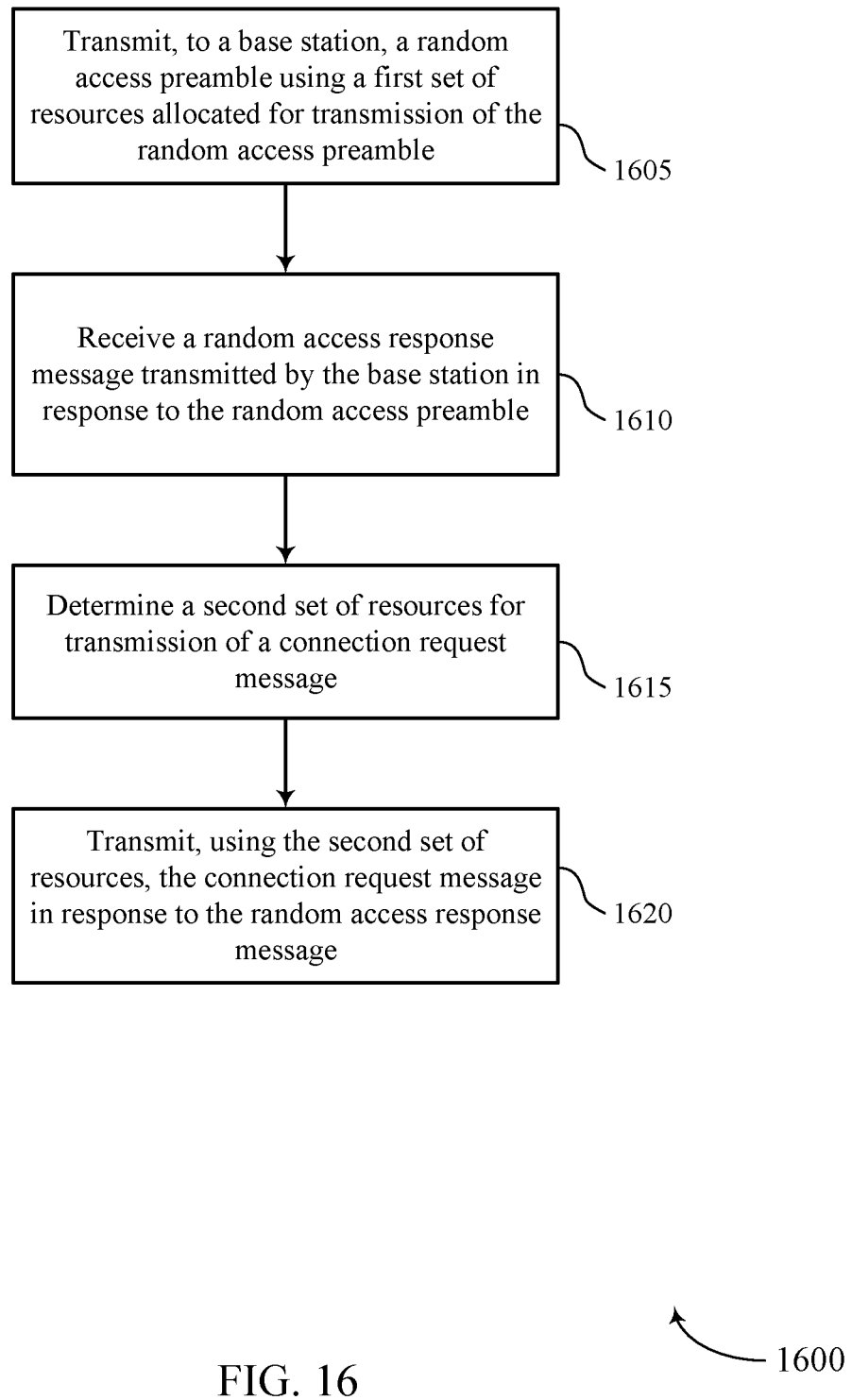

FIG. 16 shows a flowchart illustrating a method 1600 for uplink transmission parameter selection during random access message transmission and retransmission in accordance with various aspects of the present disclosure. The operations of method 1600 may be implemented by a UE 115 or its components as described herein. For example, the operations of method 1600 may be performed by a UE random access manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1605, the UE 115 may transmit, to a base station, a random access preamble using a first set of resources allocated for transmission of the random access preamble. The operations of block 1605 may be performed according to the methods described with reference to FIGS. 1 through 5. In certain examples, aspects of the operations of block 1605 may be performed by a random access transmitter as described with reference to FIGS. 6 through 9.

At 1610, the UE 115 may receive a random access response message transmitted by the base station in response to the random access preamble. The operations of block 1610 may be performed according to the methods described with reference to FIGS. 1 through 5. In certain examples, aspects of the operations of block 1610 may be performed by a random access receiver as described with reference to FIGS. 6 through 9.

At 1615, the UE 115 may determine a second set of resources for transmission of a connection request message. The operations of block 1615 may be performed according to the methods described with reference to FIGS. 1 through 5. In certain examples, aspects of the operations of block 1615 may be performed by a subframe identifier as described with reference to FIGS. 6 through 9.

At 1620, the UE 115 may transmit, using the second set of resources, the connection request message in response to the random access response message. The operations of block 1620 may be performed according to the methods described with reference to FIGS. 1 through 5. In certain examples, aspects of the operations of block 1620 may be performed by a random access transmitter as described with reference to FIGS. 6 through 9.

Figure 17:
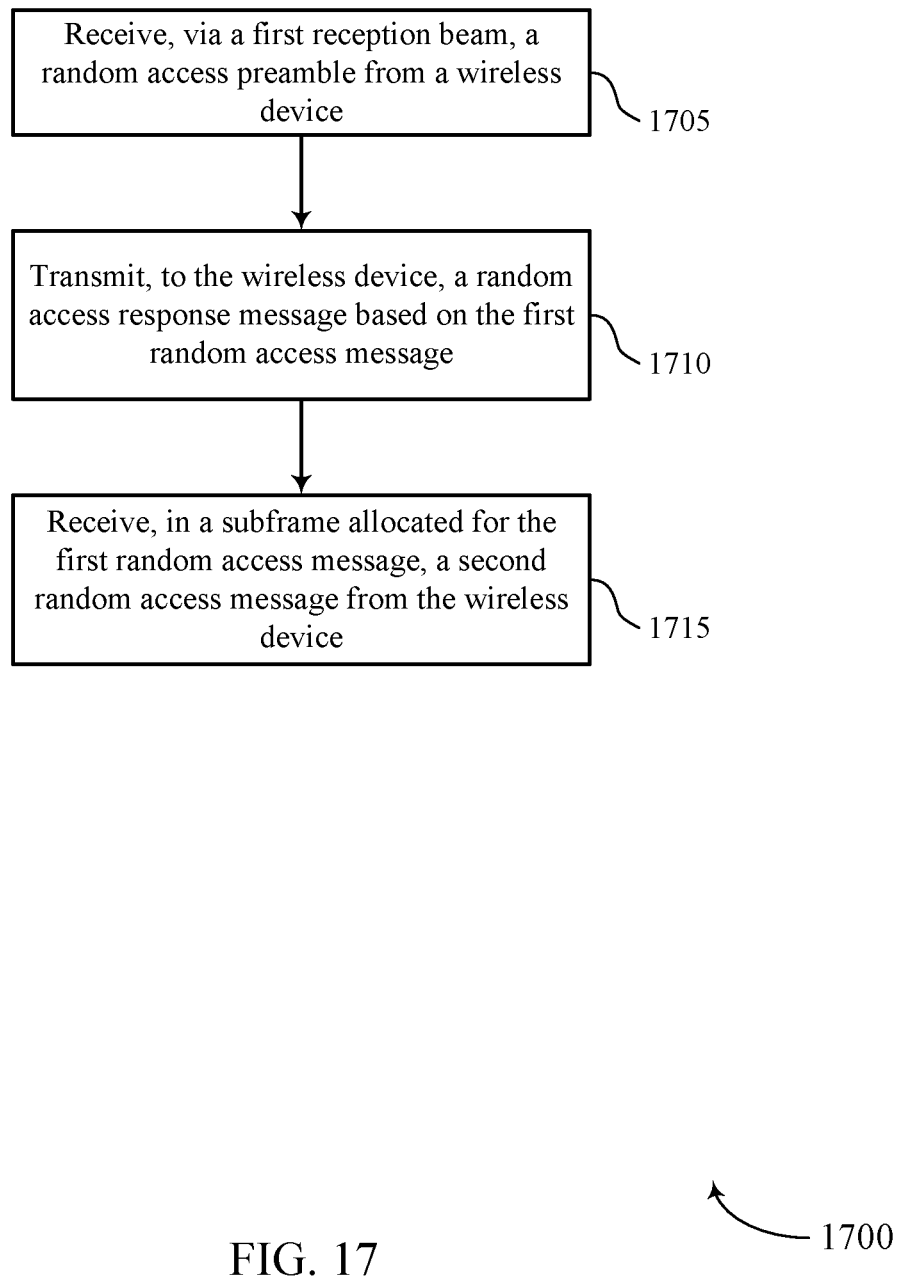

FIG. 17 shows a flowchart illustrating a method 1700 for uplink transmission parameter selection during random access message transmission and retransmission in accordance with various aspects of the present disclosure. The operations of method 1700 may be implemented by a base station 105 or its components as described herein. For example, the operations of method 1700 may be performed by a base station random access manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may receive, via a first reception beam, a random access preamble from a wireless device. The operations of block 1705 may be performed according to the methods described with reference to FIGS. 1 through 5. In certain examples, aspects of the operations of block 1705 may be performed by a beam reception component as described with reference to FIGS. 10 through 13.

At block 1710 the base station 105 may transmit, to the wireless device, a random access response message based at least in part on the first random access message. The operations of block 1710 may be performed according to the methods described with reference to FIGS. 1 through 5. In certain examples, aspects of the operations of block 1710 may be performed by a response message component as described with reference to FIGS. 10 through 13.

At block 1715 the base station 105 may receive, in a subframe allocated for the random access preamble, a connection request message from the wireless device. The operations of block 1715 may be performed according to the methods described with reference to FIGS. 1 through 5. In certain examples, aspects of the operations of block 1715 may be performed by a message receiver as described with reference to FIGS. 10 through 13.

Figure 18:
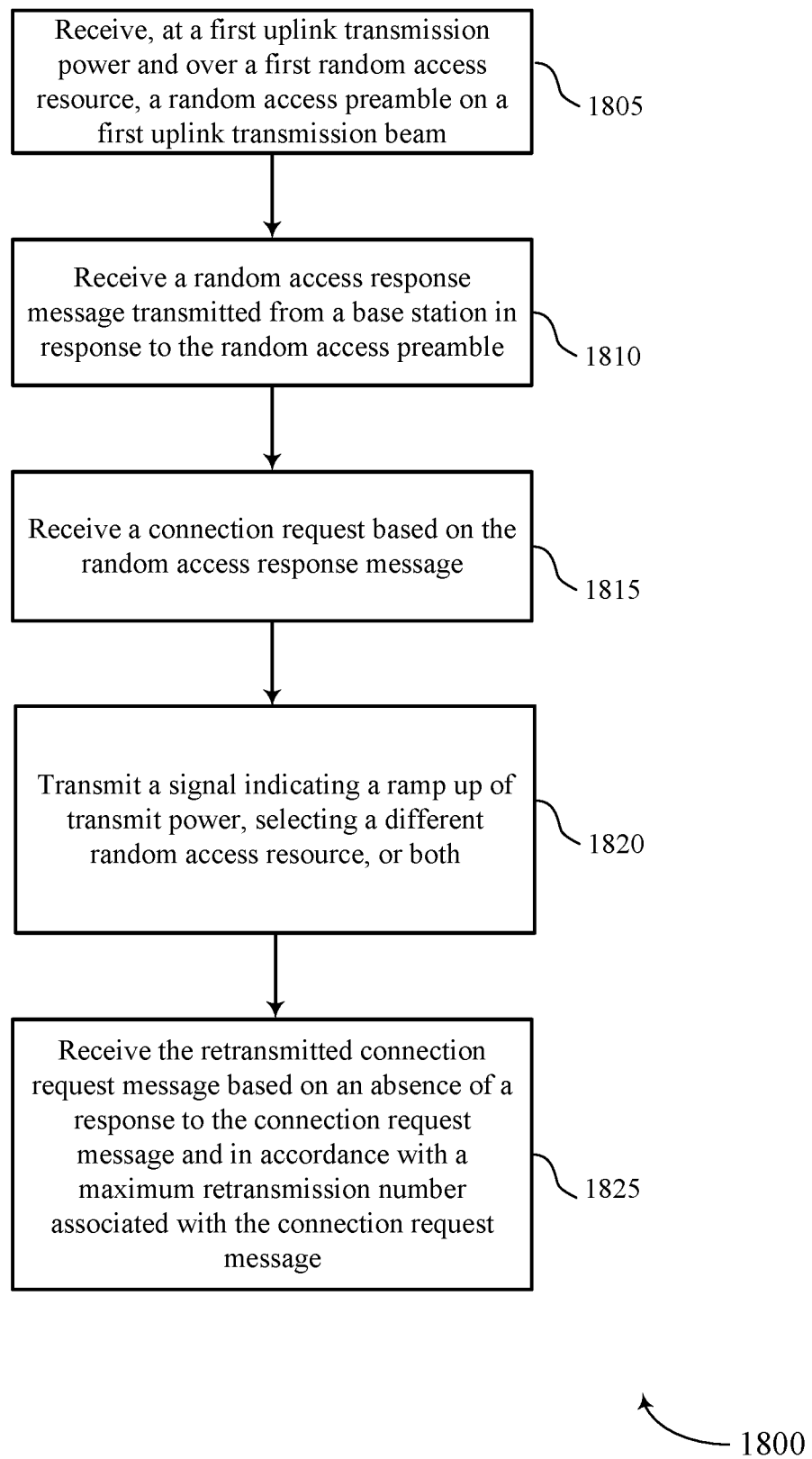

FIG. 18 shows a flowchart illustrating a method 1800 for uplink transmission parameter selection during random access message transmission and retransmission in accordance with various aspects of the present disclosure. The operations of method 1500 may be implemented by a base station 105 or its components as described herein. For example, the operations of method 1800 may be performed by a base station random access manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1805, the base station 105 may receive, at a first uplink transmission power and over a first random access resource, a random access preamble on a first uplink transmission beam. The operations of block 1805 may be performed according to the methods described with reference to FIGS. 1 through 5. In certain examples, aspects of the operations of block 1805 may be performed by a receiver as described with reference to FIGS. 10 through 13.

At 1810, the base station 105 may transmit a random access response message in response to the random access preamble. The operations of block 1810 may be performed according to the methods described with reference to FIGS. 1 through 5. In certain examples, aspects of the operations of block 1810 may be performed by a base station random access manager, or a transmitter, as described with reference to FIGS. 10 through 13.

At 1815, the base station 105 may receive a connection request based at least in part on the random access response message. The operations of block 1815 may be performed according to the methods described with reference to FIGS. 1 through 5. In certain examples, aspects of the operations of block 1815 may be performed by a base station random access manager, or a receiver, as described with reference to FIGS. 10 through 13.

At 1820, the base station 105 may transmit a signal indicating the UE to ramp up transmit power, select a different random resource, or both. In some cases, the indication may be in response to the base station 105 inferring that a RACH collision has occurred due to the absence of a connection request message from the UE, changing communication conditions, etc. The operations of block 1820 may be performed according to the methods described with reference to FIGS. 1 through 5. In certain examples, aspects of the operations of block 1820 may be performed by a transmitter as described with reference to FIGS. 10 through 13.

At 1825, the base station 105 may receive the retransmitted connection request message based at least in part on an absence of a response to the connection request and in accordance with a maximum retransmission number associated with the connection request message. In some cases, the UE 115 may autonomously decide to select different parameters for communicating the retransmission to the base station 105, for instance, by selecting a different transmission power, beam, or RACH resource than previously used in the initial RACH request message, or in the first transmission of the connection request message, or any other previous retransmission(s). The operations of block 1825 may be performed according to the methods described with reference to FIGS. 1 through 5. In certain examples, aspects of the operations of block 1825 may be performed by a receiver as described with reference to FIGS. 10 through 13.

Figure 19:
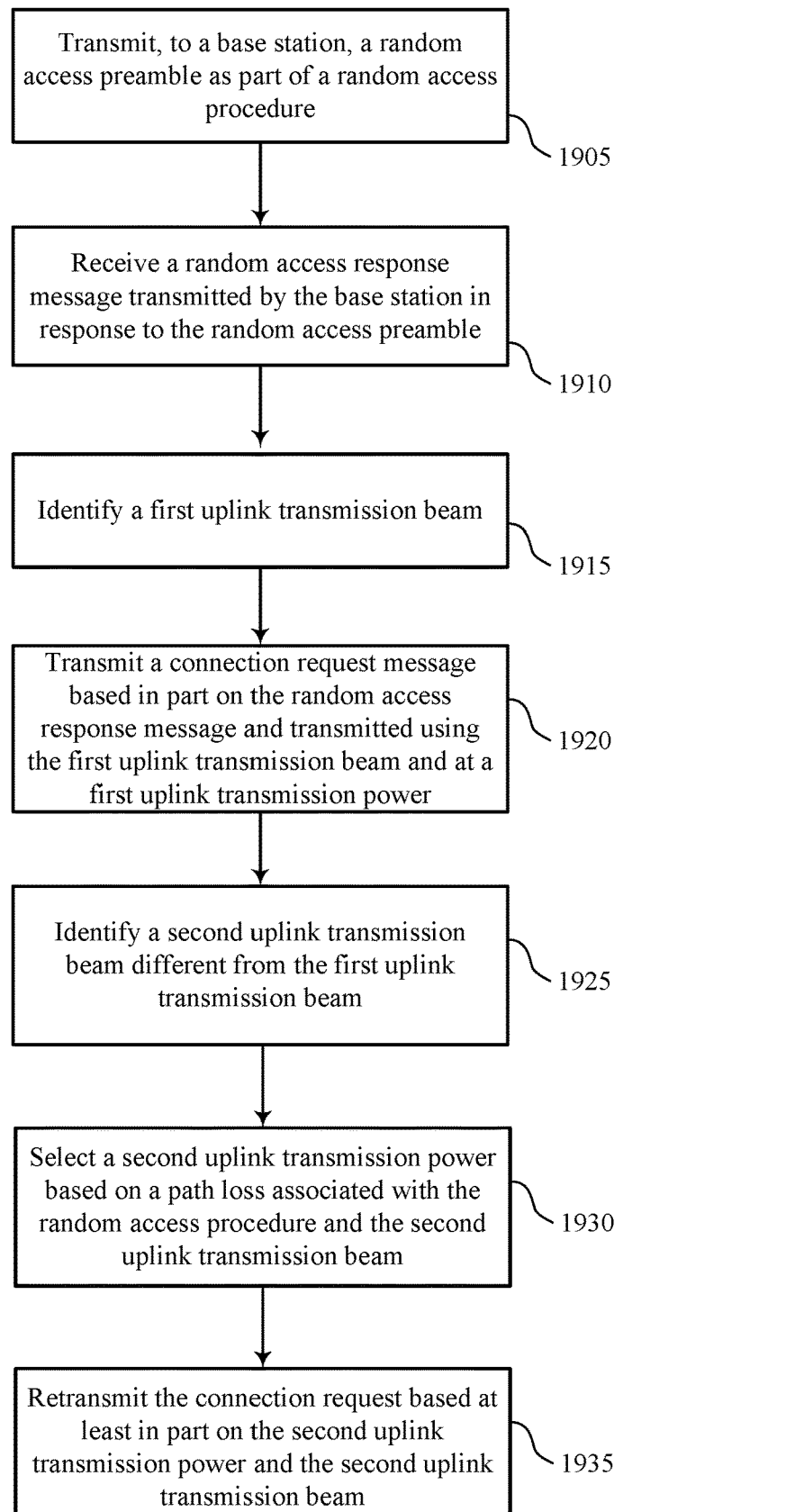

FIG. 19 shows a flowchart illustrating a method 1900 for uplink transmission parameter selection during random access message transmission and retransmission in accordance with various aspects of the present disclosure. The operations of method 1900 may be implemented by a UE 115 or its components as described herein. For example, the operations of method 1900 may be performed by a UE random access manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1905, the UE 115 may transmit, to a base station, a random access preamble as part of a random access procedure. The operations of block 1905 may be performed according to the methods described with reference to FIGS. 1 through 5. In certain examples, aspects of the operations of block 1905 may be performed by a random access transmitter as described with reference to FIGS. 6 through 9.

At 1910, the UE 115 may receive a random access response message transmitted from the base station 105 in response to the random access preamble. The operations of block 1910 may be performed according to the methods described with reference to FIGS. 1 through 5. In certain examples, aspects of the operations of block 1910 may be performed by a random access receiver as described with reference to FIGS. 6 through 9.

At 1915, the UE 115 may identify a first uplink transmission beam for the random access procedure. The operations of block 1915 may be performed according to the methods described with reference to FIGS. 1 through 5. In certain examples, aspects of the operations of block 1915 may be performed by a transmission beam identifier as described with reference to FIGS. 6 through 9.

At 1920, the UE 115 may transmit, to the base station, a connection request message based at least in part on the random access response message, the connection request being transmitted using the first uplink transmission beam and at a first uplink transmission power. The operations of block 1920 may be performed according to the methods described with reference to FIGS. 1 through 5. In certain examples, aspects of the operations of block 1920 may be performed by a random access transmitter as described with reference to FIGS. 6 through 9.

At 1925, the UE 115 may identify a second uplink transmission beam different from the first uplink transmission beam. The operations of block 1925 may be performed according to the methods described with reference to FIGS. 1 through 5. In certain examples, aspects of the operations of block 1925 may be performed by a transmission beam identifier as described with reference to FIGS. 6 through 9.

At 1930, the UE 115 may select a second uplink transmission power based at least in part on a path loss associated with the random access procedure and the identified second uplink transmission beam. The operations of block 1930 may be performed according to the methods described with reference to FIGS. 1 through 5. In certain examples, aspects of the operations of block 1930 may be performed by a random access transmitter, or a transmission power component, as described with reference to FIGS. 6 through 9

At 1935, the UE 115 may retransmit the connection request message based at least in part on the second uplink transmission beam and the second uplink transmission power. The operations of block 1935 may be performed according to the methods described with reference to FIGS. 1 through 5. In certain examples, aspects of the operations of block 1935 may be performed by a random access transmitter as described with reference to FIGS. 6 through 9.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying a first uplink transmission beam for a random access procedure;
    transmitting, at a first uplink transmission power, a random access preamble based at least in part on the first uplink transmission beam;
    receiving a random access response message transmitted from a base station in response to the random access preamble;
    identifying a second uplink transmission beam;
    selecting a second uplink transmission power based at least in part on a path loss associated with the random access procedure and the identified second uplink transmission beam, wherein selecting the second uplink transmission power is further based at least in part on a difference between a path loss associated with the random access response message and a path loss associated with transmission of the random access preamble; and
    transmitting, to the base station, a connection request based at least in part on the second uplink transmission power and the second uplink transmission beam.

2. The method of claim 1, further comprising:
    participating in a beam refinement process during reception of the random access response message, wherein the path loss associated with the random access procedure is determined based at least in part on the beam refinement process.

3. The method of claim 1, further comprising:
    receiving, from the base station, multiple synchronization signals, wherein the path loss associated with random access procedure is determined based at least in part on at least one of the multiple synchronization signals.

4. The method of claim 1, wherein transmitting the connection request is based at least in part on the second uplink transmission beam different from the first uplink transmission beam.

5. The method of claim 1, wherein selecting the second uplink transmission power is based at least in part on a uplink transmission power command conveyed in the random access response message.

6. The method of claim 5, wherein selecting the second uplink transmission power comprises adjusting the transmission power conveyed in the random access response message based at least in part on the path loss.

7. The method of claim 1, wherein selecting the second uplink transmission power is further based at least in part on a retransmission number of the connection request.

8. The method of claim 1, further comprising:
    identifying a first uplink transmission resource for transmission of the random access preamble;
    selecting, based at least in part on the random access response message, a second uplink transmission resource different from the first uplink transmission resource; and
    transmitting the connection request using the second uplink transmission resource.

9. The method of claim 1, further comprising:
    receiving, from the base station, multiple synchronization signals, wherein identifying the second uplink transmission beam for the connection request is based at least in part on reception of one or more of the multiple synchronization signals.

10. The method of claim 1, further comprising:
    selecting a third uplink transmission beam different than the second uplink transmission beam; and
    retransmitting the connection request based at least in part on the third uplink transmission beam.

11. The method of claim 1, further comprising:
    receiving, from the base station, a maximum retransmission number; and
    retransmitting the connection request based at least in part on the maximum retransmission number.

12. The method of claim 11, wherein the maximum retransmission number is associated with at least one of a total number of retransmission attempts of the connection request or a maximum number of retransmission attempts of the connection request for each of a plurality of uplink transmission powers.

13. The method of claim 1, further comprising:
    receiving, from the base station, an indication of one or more uplink transmit parameters for retransmitting the random access preamble or the connection request, wherein the one or more uplink transmit parameters comprise an uplink transmit power, an uplink transmission resource, or a combination.

14. A method for wireless communication at a user equipment (UE), comprising:
    transmitting a random access preamble as part of a random access procedure;
    receiving a random access response message transmitted from a base station in response to the random access preamble;
    identifying a first uplink transmission beam and a first uplink transmission power;
    transmitting, to the base station, a connection request based at least in part on the random access response message, the connection request being transmitted using the first uplink transmission beam and at the first uplink transmission power;
    identifying a second uplink transmission beam different from the first uplink transmission beam;
    selecting a second uplink transmission power based at least in part on a path loss associated with the random access procedure and the identified second uplink transmission beam, wherein selecting the second uplink transmission power is further based at least in part on a difference between a path loss associated with the random access response message and a path loss associated with transmission of the random access preamble; and retransmitting the connection request based at least in part on the second uplink transmission power and the second uplink transmission beam.

15. The method of claim 14, wherein the connection request is retransmitted based at least in part on an absence of a contention resolution message.

16. The method of claim 14, wherein the connection request is retransmitted based at least in part on receiving a retransmission grant from the base station.

17. The method of claim 14, further comprising:
receiving, from the base station, a maximum retransmission number associated with the connection request; and
retransmitting the connection request based at least in part on the maximum retransmission number.

18. The method of claim 17, wherein the maximum retransmission number is associated with at least one of a total number of retransmission attempts of the connection request or a maximum number of retransmission attempts of the connection request for each of a plurality of uplink transmission powers.

19. An apparatus for wireless communication, comprising:
a processor;
memory in electronic communication with the processor; and
instructions stored in the memory and executable by the processor to cause the apparatus to: identify a first uplink transmission beam for a random access procedure;
transmit, at a first uplink transmission power, a random access preamble based at least in part on the first uplink transmission beam;
receive a random access response message transmitted from a base station in response to the random access preamble;
identify a second uplink transmission beam;
select a second uplink transmission power based at least in part on a path loss associated with the random access procedure and the identified second uplink transmission beam, wherein selecting the second uplink transmission power is further based at least in part on a difference between a path loss associated with the random access response message and a path loss associated with transmission of the random access preamble; and
transmit, to the base station, a connection request based at least in part on the second uplink transmission power and the second uplink transmission beam.

20. The apparatus of claim 19, wherein the instructions are further executable by the processor to cause the apparatus to:
participate in a beam refinement process during reception of the random access response message, wherein the path loss associated with the random access procedure is determined based at least in part on the beam refinement process.

21. The apparatus of claim 19, wherein the instructions are further executable by the processor to cause the apparatus to:
receive, from the base station, multiple synchronization signals, wherein the path loss associated with the random access procedure is determined based at least in part on at least one of the multiple synchronization signals.

22. The apparatus of claim 19, wherein the instructions are further executable by the processor to cause the apparatus to:
transmit the connection request is based at least in part on the second uplink transmission beam different from the first uplink transmission beam.

23. The apparatus of claim 19, wherein the instructions are further executable by the processor to cause the apparatus to:
select the second uplink transmission power is based at least in part on a uplink transmission power command conveyed in the random access response message.

24. The apparatus of claim 19, wherein the instructions are further executable by the processor to cause the apparatus to:
select the second uplink transmission power is further based at least in part on a retransmission number of the connection request.

25. The apparatus of claim 19, wherein the instructions are further executable by the processor to cause the apparatus to:
identify a first uplink transmission resource for transmission of the random access preamble;
select, based at least in part on the random access response message, a second uplink transmission resource different from the first uplink transmission resource; and
transmit the connection request using the second uplink transmission resource.

26. The apparatus of claim 19, wherein the instructions are further executable by the processor to cause the apparatus to:
receive, from the base station, multiple synchronization signals, wherein identifying the second uplink transmission beam for the connection request is based at least in part on reception of one or more of the multiple synchronization signals.

27. The apparatus of claim 19, wherein the instructions are further executable by the processor to cause the apparatus to:
select a third uplink transmission beam different than the second uplink transmission beam; and
retransmit the connection request based at least in part on the third uplink transmission beam.

* * * * *